United States Patent
Laffargue

(10) Patent No.: US 9,726,475 B2
(45) Date of Patent: Aug. 8, 2017

(54) SYSTEMS AND METHODS FOR ENHANCING DIMENSIONING

(71) Applicant: Intermec IP Corp., Fort Mill, SC (US)

(72) Inventor: Franck Laffargue, Toulouse (FR)

(73) Assignee: Intermec IP Corp., Fort Mill, SC (US)

( * ) Notice: Subject to any disclaimer, the term of this patent is extended or adjusted under 35 U.S.C. 154(b) by 0 days.

(21) Appl. No.: 14/795,332

(22) Filed: Jul. 9, 2015

(65) Prior Publication Data

US 2015/0308816 A1 Oct. 29, 2015

Related U.S. Application Data

(63) Continuation of application No. 13/799,762, filed on Mar. 13, 2013, now Pat. No. 9,080,856.

(51) Int. Cl.

| | |
|---|---|
| *H04N 13/02* | (2006.01) |
| *G06T 17/00* | (2006.01) |
| *G06K 9/00* | (2006.01) |
| *G01B 11/14* | (2006.01) |
| *G06K 9/62* | (2006.01) |
| *G06T 7/60* | (2017.01) |

(Continued)

(52) U.S. Cl.
CPC ............ *G01B 11/14* (2013.01); *G01B 11/002* (2013.01); *G06K 9/6211* (2013.01); *G06T 7/521* (2017.01); *G06T 7/60* (2013.01); *H04N 13/02* (2013.01); *G06K 2209/19* (2013.01); *G06K 2209/401* (2013.01)

(58) Field of Classification Search
CPC ................................ H04N 7/18; G01B 11/002
See application file for complete search history.

(56) References Cited

U.S. PATENT DOCUMENTS 3,971,065 A 7/1976 Bayer
4,279,328 A 7/1981 Ahlbom
(Continued)

FOREIGN PATENT DOCUMENTS

AU 2004212587 A1 4/2005
DE 3335760 A1 4/1985
(Continued)

OTHER PUBLICATIONS

U.S. Appl. No. 13/367,978, filed Feb. 7, 2012, (Feng et al.); now abandoned.
(Continued)

*Primary Examiner* — Tsion B Owens
(74) *Attorney, Agent, or Firm* — Additon, Higgins & Pendleton, P.A.

(57) ABSTRACT

A dimensioning system can include stored data indicative of coordinate locations of each reference element in a reference image containing a pseudorandom pattern of elements. Data indicative of the coordinates of elements appearing in an acquired image of a three-dimensional space including an object can be compared to the stored data indicative of coordinate locations of each reference element. After the elements in the acquired image corresponding to the reference elements in the reference image are identified, a spatial correlation between the acquired image and the reference image can be determined. Such a numerical comparison of coordinate data reduces the computing resource requirements of graphical comparison technologies.

20 Claims, 11 Drawing Sheets

(51) Int. Cl.
*G01B 11/00* (2006.01)
*G06T 7/521* (2017.01)

(56) References Cited

U.S. PATENT DOCUMENTS

| | | |
|---|---|---|
| 4,398,811 A | 8/1983 | Nishioka et al. |
| 4,495,559 A | 1/1985 | Gelatt, Jr. |
| 4,730,190 A | 3/1988 | Win et al. |
| 4,803,639 A | 2/1989 | Steele et al. |
| 5,220,536 A | 6/1993 | Stringer et al. |
| 5,331,118 A | 7/1994 | Jensen |
| 5,359,185 A | 10/1994 | Hanson |
| 5,384,901 A | 1/1995 | Glassner et al. |
| 5,548,707 A | 8/1996 | LoNegro et al. |
| 5,555,090 A | 9/1996 | Schmutz |
| 5,590,060 A | 12/1996 | Granville et al. |
| 5,606,534 A | 2/1997 | Stringer et al. |
| 5,619,245 A | 4/1997 | Kessler et al. |
| 5,655,095 A | 8/1997 | LoNegro et al. |
| 5,661,561 A | 8/1997 | Wurz et al. |
| 5,699,161 A | 12/1997 | Woodworth |
| 5,729,750 A | 3/1998 | Ishida |
| 5,730,252 A | 3/1998 | Herbinet |
| 5,732,147 A | 3/1998 | Tao |
| 5,734,476 A | 3/1998 | Dlugos |
| 5,737,074 A | 4/1998 | Haga et al. |
| 5,767,962 A | 6/1998 | Suzuki et al. |
| 5,831,737 A | 11/1998 | Stringer et al. |
| 5,850,370 A | 12/1998 | Stringer et al. |
| 5,850,490 A | 12/1998 | Johnson |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,929,856 A | 7/1999 | LoNegro et al. |
| 5,938,710 A | 8/1999 | Lanza et al. |
| 5,959,568 A | 9/1999 | Woolley |
| 5,960,098 A | 9/1999 | Tao |
| 5,969,823 A | 10/1999 | Wurz et al. |
| 5,978,512 A | 11/1999 | Kim et al. |
| 5,979,760 A | 11/1999 | Freyman et al. |
| 5,988,862 A | 11/1999 | Kacyra et al. |
| 5,991,041 A | 11/1999 | Woodworth |
| 6,009,189 A | 12/1999 | Schaack |
| 6,025,847 A | 2/2000 | Marks |
| 6,049,386 A | 4/2000 | Stringer et al. |
| 6,053,409 A | 4/2000 | Brobst et al. |
| 6,064,759 A | 5/2000 | Buckley et al. |
| 6,067,110 A | 5/2000 | Nonaka et al. |
| 6,069,696 A | 5/2000 | McQueen et al. |
| 6,137,577 A | 10/2000 | Woodworth |
| 6,177,999 B1 | 1/2001 | Wurz et al. |
| 6,232,597 B1 | 5/2001 | Kley |
| 6,236,403 B1 | 5/2001 | Chaki |
| 6,246,468 B1 | 6/2001 | Dimsdale |
| 6,333,749 B1 | 12/2001 | Reinhardt et al. |
| 6,336,587 B1 | 1/2002 | He et al. |
| 6,369,401 B1 | 4/2002 | Lee |
| 6,373,579 B1 | 4/2002 | Ober et al. |
| 6,429,803 B1 | 8/2002 | Kumar |
| 6,457,642 B1 | 10/2002 | Good et al. |
| 6,507,406 B1 | 1/2003 | Yagi et al. |
| 6,517,004 B2 | 2/2003 | Good et al. |
| 6,519,550 B1 | 2/2003 | D'Hooge et al. |
| 6,674,904 B1 | 1/2004 | McQueen |
| 6,705,526 B1 | 3/2004 | Zhu et al. |
| 6,781,621 B1 | 8/2004 | Gobush et al. |
| 6,824,058 B2 | 11/2004 | Patel et al. |
| 6,832,725 B2 | 12/2004 | Gardiner et al. |
| 6,858,857 B2 | 2/2005 | Pease et al. |
| 6,971,580 B2 | 12/2005 | Zhu et al. |
| 6,995,762 B1 | 2/2006 | Pavlidis et al. |
| 7,057,632 B2 | 6/2006 | Yamawaki et al. |
| 7,085,409 B2 | 8/2006 | Sawhney et al. |
| 7,086,162 B2 | 8/2006 | Tyroler |
| 7,104,453 B1 | 9/2006 | Zhu et al. |
| 7,128,266 B2 | 10/2006 | Zhu et al. |
| 7,137,556 B1 | 11/2006 | Bonner et al. |
| 7,159,783 B2 | 1/2007 | Walczyk et al. |
| 7,161,688 B1 | 1/2007 | Bonner et al. |
| 7,214,954 B2 | 5/2007 | Schopp |
| 7,277,187 B2 | 10/2007 | Smith et al. |
| 7,307,653 B2 | 12/2007 | Dutta |
| 7,310,431 B2 | 12/2007 | Gokturk et al. |
| 7,413,127 B2 | 8/2008 | Ehrhart et al. |
| 7,527,205 B2 | 5/2009 | Zhu |
| 7,586,049 B2 | 9/2009 | Wurz |
| 7,602,404 B1 | 10/2009 | Reinhardt et al. |
| 7,639,722 B1 | 12/2009 | Paxton et al. |
| 7,726,575 B2 | 6/2010 | Wang et al. |
| 7,780,084 B2 | 8/2010 | Zhang et al. |
| 7,788,883 B2 | 9/2010 | Buckley et al. |
| 7,974,025 B2 | 7/2011 | Topliss |
| 8,027,096 B2 | 9/2011 | Feng et al. |
| 8,028,501 B2 | 10/2011 | Buckley et al. |
| 8,050,461 B2 | 11/2011 | Shpunt et al. |
| 8,055,061 B2 | 11/2011 | Katano |
| 8,102,395 B2 | 1/2012 | Kondo et al. |
| 8,132,728 B2 | 3/2012 | Dwinell et al. |
| 8,134,717 B2 | 3/2012 | Pangrazio et al. |
| 8,149,224 B1 | 4/2012 | Kuo et al. |
| 8,194,097 B2 | 6/2012 | Xiao et al. |
| 8,212,889 B2 | 7/2012 | Chanas et al. |
| 8,228,510 B2 | 7/2012 | Pangrazio et al. |
| 8,230,367 B2 | 7/2012 | Bell et al. |
| 8,294,969 B2 | 10/2012 | Plesko |
| 8,305,458 B2 | 11/2012 | Hara |
| 8,310,656 B2 | 11/2012 | Zalewski |
| 8,313,380 B2 | 11/2012 | Zalewski et al. |
| 8,317,105 B2 | 11/2012 | Kotlarsky et al. |
| 8,322,622 B2 | 12/2012 | Liu |
| 8,339,462 B2 | 12/2012 | Stec et al. |
| 8,350,959 B2 | 1/2013 | Topliss et al. |
| 8,351,670 B2 | 1/2013 | Ijiri et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,976 B2 | 2/2013 | Mohideen et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,437,539 B2 | 5/2013 | Komatsu et al. |
| 8,441,749 B2 | 5/2013 | Brown et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,463,079 B2 | 6/2013 | Ackley et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,576,390 B1 | 11/2013 | Nunnink |
| 8,579,200 B2 | 11/2013 | Samek et al. |

(56) References Cited

U.S. PATENT DOCUMENTS

| | | |
|---|---|---|
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,792,688 B2 | 7/2014 | Unsworth |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,810,779 B1 | 8/2014 | Hilde |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,897,596 B1 | 11/2014 | Passmore et al. |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,014,441 B2 | 4/2015 | Truyen et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |

(56) References Cited

U.S. PATENT DOCUMENTS

| | | |
|---|---|---|
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,082,195 B2 | 7/2015 | Holeva et al. |
| 9,142,035 B1 | 9/2015 | Rotman |
| 9,233,470 B1 | 1/2016 | Bradski et al. |
| 9,299,013 B1 | 3/2016 | Curlander et al. |
| 9,424,749 B1 | 8/2016 | Reed et al. |
| 9,486,921 B1 | 11/2016 | Straszheim et al. |
| 2001/0027995 A1 | 10/2001 | Patel et al. |
| 2001/0032879 A1 | 10/2001 | He et al. |
| 2002/0054289 A1 | 5/2002 | Thibault et al. |
| 2002/0067855 A1 | 6/2002 | Chiu et al. |
| 2002/0109835 A1 | 8/2002 | Goetz |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2002/0196534 A1 | 12/2002 | Lizotte et al. |
| 2003/0038179 A1 | 2/2003 | Tsikos et al. |
| 2003/0053513 A1 | 3/2003 | Vatan et al. |
| 2003/0063086 A1 | 4/2003 | Baumberg |
| 2003/0091227 A1 | 5/2003 | Chang et al. |
| 2003/0156756 A1 | 8/2003 | Gokturk et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0008259 A1 | 1/2004 | Gokturk et al. |
| 2004/0024754 A1 | 2/2004 | Mane et al. |
| 2004/0066329 A1 | 4/2004 | Zeitfuss et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2004/0118928 A1 | 6/2004 | Patel et al. |
| 2004/0122779 A1 | 6/2004 | Stickler et al. |
| 2004/0155975 A1 | 8/2004 | Hart et al. |
| 2004/0165090 A1 | 8/2004 | Ning |
| 2004/0184041 A1 | 9/2004 | Schopp |
| 2004/0211836 A1 | 10/2004 | Patel et al. |
| 2004/0214623 A1 | 10/2004 | Takahashi et al. |
| 2004/0233461 A1 | 11/2004 | Armstrong et al. |
| 2004/0258353 A1 | 12/2004 | Gluckstad et al. |
| 2005/0006477 A1 | 1/2005 | Patel |
| 2005/0117215 A1 | 6/2005 | Lange |
| 2005/0128196 A1 | 6/2005 | Popescu et al. |
| 2005/0168488 A1 | 8/2005 | Montague |
| 2005/0211782 A1 | 9/2005 | Martin |
| 2005/0264867 A1 | 12/2005 | Cho et al. |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0112023 A1 | 5/2006 | Horhann |
| 2006/0151604 A1 | 7/2006 | Zhu et al. |
| 2006/0159307 A1 | 7/2006 | Anderson et al. |
| 2006/0159344 A1 | 7/2006 | Shao et al. |
| 2006/0232681 A1 | 10/2006 | Okada |
| 2006/0255150 A1 | 11/2006 | Longacre |
| 2006/0269165 A1 | 11/2006 | Viswanathan |
| 2006/0291719 A1 | 12/2006 | Ikeda et al. |
| 2007/0003154 A1 | 1/2007 | Sun et al. |
| 2007/0025612 A1 | 2/2007 | Iwasaki et al. |
| 2007/0031064 A1 | 2/2007 | Zhao et al. |
| 2007/0063048 A1 | 3/2007 | Havens et al. |
| 2007/0116357 A1 | 5/2007 | Dewaele |
| 2007/0127022 A1 | 6/2007 | Cohen et al. |
| 2007/0143082 A1 | 6/2007 | Degnan |
| 2007/0153293 A1 | 7/2007 | Gruhlke et al. |
| 2007/0171220 A1 | 7/2007 | Kriveshko |
| 2007/0177011 A1 | 8/2007 | Lewin et al. |
| 2007/0181685 A1 | 8/2007 | Zhu et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |
| 2008/0035390 A1 | 2/2008 | Wurz |
| 2008/0056536 A1 | 3/2008 | Hildreth et al. |
| 2008/0062164 A1 | 3/2008 | Bassi et al. |
| 2008/0077265 A1 | 3/2008 | Boyden |
| 2008/0164074 A1 | 7/2008 | Wurz |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0278790 A1 | 11/2008 | Boesser et al. |
| 2009/0059004 A1 | 3/2009 | Bochicchio |
| 2009/0095047 A1 | 4/2009 | Patel et al. |
| 2009/0134221 A1 | 5/2009 | Zhu et al. |
| 2009/0195790 A1 | 8/2009 | Zhu et al. |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler |
| 2009/0273770 A1 | 11/2009 | Bauhahn et al. |
| 2009/0313948 A1 | 12/2009 | Buckley et al. |
| 2009/0323084 A1 | 12/2009 | Dunn et al. |
| 2009/0323121 A1 | 12/2009 | Valkenburg |
| 2010/0035637 A1 | 2/2010 | Varanasi et al. |
| 2010/0060604 A1 | 3/2010 | Zwart et al. |
| 2010/0091104 A1 | 4/2010 | Sprigle |
| 2010/0118200 A1 | 5/2010 | Gelman et al. |
| 2010/0128109 A1 | 5/2010 | Banks |
| 2010/0161170 A1 | 6/2010 | Siris |
| 2010/0171740 A1 | 7/2010 | Andersen et al. |
| 2010/0172567 A1 | 7/2010 | Prokoski |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0223276 A1 | 9/2010 | Al-Shameri et al. |
| 2010/0245850 A1 | 9/2010 | Lee et al. |
| 2010/0254611 A1 | 10/2010 | Arnz |
| 2010/0303336 A1 | 12/2010 | Abraham |
| 2010/0315413 A1 | 12/2010 | Izadi et al. |
| 2011/0019155 A1 | 1/2011 | Daniel et al. |
| 2011/0040192 A1 | 2/2011 | Brenner et al. |
| 2011/0043609 A1 | 2/2011 | Choi et al. |
| 2011/0099474 A1 | 4/2011 | Grossman et al. |
| 2011/0169999 A1 | 7/2011 | Grunow et al. |
| 2011/0188054 A1 | 8/2011 | Petronius et al. |
| 2011/0188741 A1 | 8/2011 | Sones et al. |
| 2011/0202554 A1 | 8/2011 | Powilleit et al. |
| 2011/0234389 A1 | 9/2011 | Mellin |
| 2011/0235854 A1 | 9/2011 | Berger et al. |
| 2011/0249864 A1 | 10/2011 | Venkatesan et al. |
| 2011/0254840 A1 | 10/2011 | Halstead |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |

(56) References Cited

U.S. PATENT DOCUMENTS

| | | |
|---|---|---|
| 2011/0288818 A1 | 11/2011 | Thierman |
| 2011/0301994 A1 | 12/2011 | Tieman |
| 2011/0303748 A1 | 12/2011 | Lemma et al. |
| 2011/0310227 A1 | 12/2011 | Konertz et al. |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0111946 A1 | 5/2012 | Golant |
| 2012/0113223 A1 | 5/2012 | Hilliges et al. |
| 2012/0113250 A1 | 5/2012 | Farlotti et al. |
| 2012/0126000 A1 | 5/2012 | Kunzig et al. |
| 2012/0140300 A1 | 6/2012 | Freeman |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0193423 A1 | 8/2012 | Samek |
| 2012/0197464 A1 | 8/2012 | Wang et al. |
| 2012/0203647 A1 | 8/2012 | Smith |
| 2012/0218389 A1* | 8/2012 | Nowak ............... A61C 19/04 348/47 |
| 2012/0218436 A1 | 8/2012 | Rodriguez et al. |
| 2012/0223141 A1 | 9/2012 | Good et al. |
| 2012/0224026 A1 | 9/2012 | Bayer et al. |
| 2012/0236288 A1 | 9/2012 | Stanley |
| 2012/0242852 A1 | 9/2012 | Hayward et al. |
| 2012/0256901 A1 | 10/2012 | Bendall |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0294549 A1 | 11/2012 | Doepke |
| 2012/0299961 A1 | 11/2012 | Ramkumar et al. |
| 2012/0300991 A1 | 11/2012 | Mikio |
| 2012/0313848 A1 | 12/2012 | Galor et al. |
| 2012/0314030 A1 | 12/2012 | Datta |
| 2012/0314058 A1 | 12/2012 | Bendall et al. |
| 2012/0316820 A1* | 12/2012 | Nakazato ............. G01B 11/25 702/94 |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0075168 A1 | 3/2013 | Amundsen et al. |
| 2013/0094069 A1 | 4/2013 | Lee et al. |
| 2013/0101158 A1 | 4/2013 | Lloyd et al. |
| 2013/0175341 A1 | 7/2013 | Kearney et al. |
| 2013/0175343 A1 | 7/2013 | Good |
| 2013/0200150 A1 | 8/2013 | Reynolds et al. |
| 2013/0201288 A1 | 8/2013 | Billerbeck et al. |
| 2013/0208164 A1 | 8/2013 | Cazier et al. |
| 2013/0211790 A1 | 8/2013 | Loveland et al. |
| 2013/0223673 A1 | 8/2013 | Davis et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0291998 A1 | 11/2013 | Konnerth |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1* | 11/2013 | Bremer ............... G01B 11/02 348/135 |
| 2013/0308013 A1 | 11/2013 | Li et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0329012 A1 | 12/2013 | Bartos |
| 2013/0329013 A1 | 12/2013 | Metois et al. |
| 2013/0342343 A1 | 12/2013 | Harring et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0021259 A1 | 1/2014 | Moed et al. |
| 2014/0025584 A1 | 1/2014 | Liu et al. |
| 2014/0031665 A1 | 1/2014 | Pinto et al. |
| 2014/0034731 A1 | 2/2014 | Gao et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0058612 A1 | 2/2014 | Wong et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078292 A1* | 3/2014 | Boutboul ........... G01B 11/2433 348/135 |
| 2014/0078341 A1 | 3/2014 | Havens et al. |
| 2014/0078342 A1 | 3/2014 | Li et al. |
| 2014/0078345 A1 | 3/2014 | Showering |
| 2014/0091147 A1 | 4/2014 | Evans et al. |
| 2014/0097238 A1 | 4/2014 | Ghazizadeh |
| 2014/0098091 A1 | 4/2014 | Hori |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1* | 4/2014 | McCloskey .......... G06Q 10/083 348/135 |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0104664 A1 | 4/2014 | Lee |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Long et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0135984 A1 | 5/2014 | Hirata |
| 2014/0136208 A1 | 5/2014 | Maltseff et al. |
| 2014/0139654 A1 | 5/2014 | Takahashi |
| 2014/0140585 A1 | 5/2014 | Wang |
| 2014/0151453 A1 | 6/2014 | Meier et al. |
| 2014/0152882 A1 | 6/2014 | Samek et al. |
| 2014/0152975 A1 | 6/2014 | Ko |
| 2014/0158468 A1 | 6/2014 | Adami |
| 2014/0158770 A1 | 6/2014 | Sevier et al. |
| 2014/0159869 A1 | 6/2014 | Zumsteg et al. |
| 2014/0166755 A1 | 6/2014 | Liu et al. |

(56) References Cited

U.S. PATENT DOCUMENTS

| | | |
|---|---|---|
| 2014/0166757 A1 | 6/2014 | Smith |
| 2014/0166759 A1 | 6/2014 | Liu et al. |
| 2014/0168380 A1 | 6/2014 | Heidemann et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0192187 A1 | 7/2014 | Atwell et al. |
| 2014/0192551 A1 | 7/2014 | Masaki |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0205150 A1 | 7/2014 | Ogawa |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0225918 A1 | 8/2014 | Mittal et al. |
| 2014/0225985 A1 | 8/2014 | Klusza et al. |
| 2014/0231500 A1 | 8/2014 | Ehrhart et al. |
| 2014/0232930 A1 | 8/2014 | Anderson |
| 2014/0240464 A1 | 8/2014 | Lee |
| 2014/0247279 A1 | 9/2014 | Nicholas et al. |
| 2014/0247280 A1 | 9/2014 | Nicholas et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0268093 A1 | 9/2014 | Tohme et al. |
| 2014/0270196 A1 | 9/2014 | Braho et al. |
| 2014/0270229 A1 | 9/2014 | Braho |
| 2014/0270361 A1 | 9/2014 | Amma et al. |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0306833 A1 | 10/2014 | Ricci |
| 2014/0307855 A1 | 10/2014 | Withagen et al. |
| 2014/0312121 A1 | 10/2014 | Lu et al. |
| 2014/0313527 A1* | 10/2014 | Askan ............... H04N 1/38 358/1.9 |
| 2014/0319219 A1 | 10/2014 | Liu et al. |
| 2014/0319220 A1 | 10/2014 | Coyle |
| 2014/0319221 A1 | 10/2014 | Oberpriller et al. |
| 2014/0320408 A1 | 10/2014 | Zagorsek et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0347553 A1 | 11/2014 | Ovsiannikov et al. |
| 2014/0350710 A1 | 11/2014 | Gopalkrishnan et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2014/0379613 A1 | 12/2014 | Nishitani et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009301 A1 | 1/2015 | Ribnick et al. |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0036876 A1 | 2/2015 | Marrion et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0062369 A1 | 3/2015 | Gehring et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0116498 A1 | 4/2015 | Vartiainen et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0163474 A1 | 6/2015 | You |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204662 A1 | 7/2015 | Kobayashi et al. |
| 2015/0204671 A1 | 7/2015 | Showering |
| 2015/0213647 A1 | 7/2015 | Laffargue et al. |
| 2015/0229838 A1 | 8/2015 | Hakim et al. |
| 2015/0269403 A1 | 9/2015 | Lei et al. |
| 2015/0276379 A1 | 10/2015 | Ni et al. |
| 2015/0301181 A1 | 10/2015 | Herschbach |
| 2015/0308816 A1 | 10/2015 | Laffargue |
| 2015/0325036 A1 | 11/2015 | Lee |
| 2015/0355470 A1 | 12/2015 | Herschbach |
| 2016/0048725 A1 | 2/2016 | Holz et al. |
| 2016/0063429 A1 | 3/2016 | Varley et al. |
| 2016/0090283 A1 | 3/2016 | Svensson et al. |
| 2016/0090284 A1 | 3/2016 | Svensson et al. |
| 2016/0138247 A1 | 5/2016 | Conway et al. |
| 2016/0138248 A1 | 5/2016 | Conway et al. |
| 2016/0138249 A1 | 5/2016 | Conway et al. |
| 2016/0169665 A1 | 6/2016 | Deschenes et al. |
| 2016/0187186 A1 | 6/2016 | Coleman et al. |
| 2016/0187210 A1 | 6/2016 | Coleman et al. |
| 2016/0191801 A1 | 6/2016 | Sivan |
| 2016/0202478 A1 | 7/2016 | Masson et al. |
| 2017/0115490 A1 | 4/2017 | Hsieh et al. |

FOREIGN PATENT DOCUMENTS

| | | |
|---|---|---|
| DE | 10210813 A1 | 10/2003 |
| DE | 102007037282 A1 | 3/2008 |
| EP | 1111435 A2 | 6/2001 |
| EP | 1443312 A1 | 8/2004 |
| EP | 2286932 A2 | 2/2011 |
| EP | 2381421 A2 | 10/2011 |

(56) References Cited

FOREIGN PATENT DOCUMENTS

| | | | |
|---|---|---|---|
| EP | 2533009 A2 | 12/2012 |
| EP | 2722656 A1 | 4/2014 |
| EP | 2779027 A1 | 9/2014 |
| EP | 2833323 A2 | 2/2015 |
| EP | 2843590 A2 | 3/2015 |
| EP | 2845170 A1 | 3/2015 |
| GB | 2503978 A | 1/2014 |
| JP | H04129902 A | 4/1992 |
| JP | 2008210276 A | 9/2008 |
| JP | 2014210646 A | 11/2014 |
| KR | 20110013200 A | 2/2011 |
| KR | 20110117020 A | 10/2011 |
| KR | 20120028109 A | 3/2012 |
| WO | 96/40452 A1 | 12/1996 |
| WO | 0077726 A1 | 12/2000 |
| WO | 0114836 A1 | 3/2001 |
| WO | 2006095110 A1 | 9/2006 |
| WO | 2007015059 A1 | 2/2007 |
| WO | 2011017241 A1 | 2/2011 |
| WO | 2012175731 A1 | 12/2012 |
| WO | 2013021157 A1 | 2/2013 |
| WO | 2013033442 A1 | 3/2013 |
| WO | 2013163789 A1 | 11/2013 |
| WO | 2013166368 A1 | 11/2013 |
| WO | 2013173985 A1 | 11/2013 |
| WO | 20130184340 A1 | 12/2013 |
| WO | 2014019130 A1 | 2/2014 |
| WO | 2014102341 A1 | 7/2014 |
| WO | 2014110495 A1 | 7/2014 |
| WO | 2014149702 A1 | 9/2014 |
| WO | 2014151746 A2 | 9/2014 |
| WO | 2015006865 A1 | 1/2015 |
| WO | 2016020038 A1 | 2/2016 |
| WO | 2016061699 A1 | 4/2016 |

OTHER PUBLICATIONS

U.S. Appl. No. 14/462,801 for Mobile Computing Device With Data Cognition Software, filed Aug. 19, 2014 (Todeschini et al.); 38 pages.
U.S. Appl. No. 14/596,757 for System and Method for Detecting Barcode Printing Errors, filed Jan. 14, 2015 (Ackley); 41 pages.
U.S. Appl. No. 14/277,337 for Multipurpose Optical Reader, filed May 14, 2014 (Jovanovski et al.); 59 pages.
U.S. Appl. No. 14/200,405 for Indicia Reader for Size-Limited Applications, filed Mar. 7, 2014 (Feng et al.); 42 pages.
U.S. Appl. No. 14/662,922 for Multifunction Point of Sale System, filed Mar. 19, 2015 (Van Horn et al.); 41 pages.
U.S. Appl. No. 14/446,391 for Multifunction Point of Sale Apparatus With Optical Signature Capture, filed Jul. 30, 2014 (Good et al.); 37 pages.
U.S. Appl. No. 29/528,165 for In-Counter Barcode Scanner, filed May 27, 2015 (Oberpriller et al.); 13 pages.
U.S. Appl. No. 29/528,890 for Mobile Computer Housing, filed Jun. 2, 2015 (Fitch et al.); 61 pages.
U.S. Appl. No. 14/614,796 for Cargo Apportionment Techniques, filed Feb. 5, 2015 (Morton et al.); 56 pages.
U.S. Appl. No. 29/516,892 for Table Computer, filed Feb. 6, 2015 (Bidwell et al.); 13 pages.
U.S. Appl. No. 29/523,098 for Handle for a Tablet Computer, filed Apr. 7, 2015 (Bidwell et al.); 17 pages.
U.S. Appl. No. 14/578,627 for Safety System and Method, filed Dec. 22, 2014 (Ackley et al.); 32 pages.
U.S. Appl. No. 14/573,022 for Dynamic Diagnostic Indicator Generation, filed Dec. 17, 2014 (Goldsmith); 43 pages.
U.S. Appl. No. 14/529,857 for Barcode Reader With Security Features, filed Oct. 31, 2014 (Todeschini et al.); 32 pages.
U.S. Appl. No. 14/519,195 for Handheld Dimensioning System With Feedback, filed Oct. 21, 2014 (Laffargue et al.); 39 pages.
U.S. Appl. No. 14/519,211 for System and Method for Dimensioning, filed Oct. 21, 2014 (Ackley et al.); 33 pages.

U.S. Appl. No. 14/519,233 for Handheld Dimensioner With Data-Quality Indication, filed Oct. 21, 2014 (Laffargue et al.); 36 pages.
U.S. Appl. No. 14/533,319 for Barcode Scanning System Using Wearable Device With Embedded Camera, filed Nov. 5, 2014 (Todeschini); 29 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device, filed May 29, 2015 (Fitch et al.); 9 pages.
U.S. Appl. No. 14/519,249 for Handheld Dimensioning System With Measurement-Conformance Feedback, filed Oct. 21, 2014 (Ackley et al.); 36 pages.
U.S. Appl. No. 29/519,017 for Scanner, filed Mar. 2, 2015 (Zhou et al.); 11 pages.
U.S. Appl. No. 14/398,542 for Portable Electronic Devices Having a Separate Location Trigger Unit for Use in Controlling an Application Unit, filed Nov. 3, 2014 (Bian et al.); 22 pages.
U.S. Appl. No. 14/405,278 for Design Pattern for Secure Store, filed Mar. 9, 2015 (Zhu et al.); 23 pages.
U.S. Appl. No. 14/590,024 for Shelving and Package Locating Systems for Delivery Vehicles, filed Jan. 6, 2015 (Payne); 31 pages.
U.S. Appl. No. 14/568,305 for Auto-Contrast Viewfinder for an Indicia Reader, filed Dec. 12, 2014 (Todeschini); 29 pages.
U.S. Appl. No. 29/526,918 for Charging Base, filed May 14, 2015 (Fitch et al.); 10 pages.
U.S. Appl. No. 14/580,262 for Media Gate for Thermal Transfer Printers, filed Dec. 23, 2014 (Bowles); 36 pages.
European Search Report for Related EP Application No. 15189214.8, dated Mar. 3, 2016, 9 pages.
Office Action in counterpart European Application No. 13186043.9 dated Sep. 30, 2015, pp. 1-7.
Lloyd et al., "System for Monitoring the Condition of Packages Throughout Transit", U.S. Appl. No. 14/865,575, filed Sep. 25, 2015, 59 pages, not yet published.
James Chamberlin, "System and Method for Picking Validation", U.S. Appl. No. 14/865,797, filed Sep. 25, 2015, 44 pages, not yet published.
Jovanovski et al., "Image-Stitching for Dimensioning", U.S. Appl. No. 14/870,488, filed Sep. 30, 2015, 45 pages, not yet published.
Todeschini et al.; "Depth Sensor Based Auto-Focus System for an Indicia Scanner," U.S. Appl. No. 14/872,176, filed Oct. 1, 2015, 44 pages, not yet published.
Wikipedia, "3D projection" Downloaded on Nov. 25, 2015 from www.wikipedia.com, 4 pages.
McCloskey et al., "Methods for Improving the Accuracy of Dimensioning-System Measurements," U.S. Appl. No. 14/873,613, filed Sep. 2, 2015, 47 pages, not yet published.
Search Report in counterpart European Application No. 15182675.7, Dated Dec. 4, 2015, 10 pages.
McCloskey et al., "Image Transformation for Indicia Reading," U.S. Appl. No. 14/982,032, filed Oct. 30, 2015, 48 pages, not yet published.
Search Report and Opinion in related GB Application No. 1517112.7, Dated Feb. 19, 2016, 6 Pages.
Lloyd, Ryan and Scott McCloskey, "Recognition of 3D Package Shapes for Singe Camera Metrology" IEEE Winter Conference on Applications of computer Visiona, IEEE, Mar. 24, 2014, pp. 99-106, {retrieved on Jun. 16, 2014}, Authors are employees of common Applicant.
Peter Clarke, Actuator Developer Claims Anti-Shake Breakthrough for Smartphone Cams, Electronic Engineering Times, p. 24, May 16, 2011.
Spiller, Jonathan; Object Localization Using Deformable Templates, Master's Dissertation, University of the Witwatersrand, Johannesburg, South Africa, 2007; 74 pages.
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
European Search Report for application No. EP13186043 dated Feb. 26, 2014 (now EP2722656 (Apr. 23, 2014)); Total pp. 7.

(56) References Cited

OTHER PUBLICATIONS

International Search Report for PCT/US2013/039438 (WO2013166368), Oct. 1, 2013, 7 pages.
U.S. Appl. No. 14/453,019, not yet published, filed Aug. 6, 2014, Hand Held Products Inc., Dimensioning System With Guided Alignment: 31 pages.
European Office Action for application EP 13186043, dated Jun. 12, 2014(now EP2722656 (Apr. 23, 2014)), Total of 6 pages.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.
U.S. Appl. No. 14/801,023, Tyler Doomenbal et al., filed Jul. 16, 2015, not published yet, Adjusting Dimensioning Results Using Augmented Reality, 39 pages.
Wikipedia, YUV description and definition, downloaded from http://www.wikipeida.org/wiki/YUV on Jun. 29, 2012, 10 pages.
YUV Pixel Format, downloaded from http://www.fource.org/yuv.php on Jun. 29, 2012; 13 pages.
YUV to RGB Conversion, downloaded from http://www.fource.org/fccyvrgb.php on Jun. 29, 2012; 5 pages.
Benos et al., "Semi-Automatic Dimensioning with Imager of a Portable Device," U.S. Appl. No. 61/149,912, filed Feb. 4, 2009 (now expired), 56 pages.
Dimensional Weight—Wikipedia, the Free Encyclopedia, URL=http://en.wikipedia.org/wiki/Dimensional_weight, download date Aug. 1, 2008, 2 pages.
Dimensioning—Wikipedia, the Free Encyclopedia, URL=http://en.wikipedia.org/wiki/Dimensioning, download date Aug. 1, 2008, 1 page.
European Patent Office Action for Application No. 14157971.4-1906, Dated Jul. 16, 2014, 5 pages.
European Patent Search Report for Application No. 14157971.4-1906, Dated Jun. 30, 2014, 6 pages.
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.
Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008) , 6 pages.
Mouaddib E et al. "Recent Progress in Structured Light in order to Solve the Correspondence Problem in Stereo Vision" Proceedings of the 1997 IEEE International Conference on Robotics and Automation, Apr. 1997; 7 pages.
Proesmans, Marc et al. "Active Acquisition of 3D Shape for Moving Objects" 0-7803-3258-X/96 1996 IEEE; 4 pages.
Salvi, Joaquim et al. "Pattern Codification Strategies in Structured Light Systems" published in Pattern Recognition; The Journal of the Pattern Recognition Society,; Accepted Oct. 2, 2003; 23 pages.
EP Search and Written Opinion Report in related matter EP Application No. 14181437.6, Dated Mar. 26, 2015, 7 pages.
Hetzel, Gunter et al.; "3D Object Recognition from Range Images using Local Feature Histograms,", Proceedings 2OO1 IEEE Conference on Computer Vision and Pattern Recognition. CVPR 2001. Kauai, Hawaii, Dec. 8-14, 2001; pp. 394-399, XP010584149, ISBN: 978-0-7695-1272-3.
U.S. Appl. No. 14/519,179, Serge Thuries et al., filed Oct. 21, 2014, not published yet. Dimensioning System With Multipath Interference Mitigation; 40 pages.
U.S. Appl. No. 14/519,249, H. Sprague Ackley et al., filed Oct. 21, 2014, not published yet. Handheld Dimensioning System With Measurement-Conformance Feedback; 36 pages.
U.S. Appl. No. 14/519,233, Franck Laffargue et al., filed Oct. 21, 2014, not published yet. Handheld Dimensioner With Data-Quality Indication; 34 pages.
U.S. Appl. No. 14/519,211, H. Sprague Ackley et al., filed Oct. 21, 2014, System and Method for Dimensioning; not published yet. 33 pages.

U.S. Appl. No. 14/519,195, Franck Laffargue et al., filed Oct. 21, 2014, not published yet. Handheld Dimensioning System With Feedback; 35 pages.
U.S. Appl. No. 14/800,757 , Eric Todeschini, filed Jul. 16, 2015, not published yet, Dimensioning and Maging Items, 80 pages.
U.S. Appl. No. 14/747,197, Serge Thuries et al., filed Jun. 23, 2015, not published yet, Optical Pattern Projector; 33 pages.
U.S. Appl. No. 14/747,490, Brian L. Jovanovski et al., filed Jun. 23, 2015, not published yet, Dual-Projector Three-Dimensional Scanner; 40 pages.
U.S. Appl. No. 14/715,916, H. Sprague Ackley, filed May 19, 2015, not published yet, Evaluating Image Values; 54 pages.
U.S. Appl. No. 14/793,149, H. Sprague Ackley, filed Jul. 7, 2015, not published yet, Mobile Dimensioner Apparatus for Use in Commerce; 57 pages.
U.S. Appl. No. 14/740,373, H. Sprague Ackley et al., filed Jun. 16, 2015, not published yet, Calibrating a Volume Dimensioner; 63 pages.
Intention to Grant in counterpart European Application No. 14157971.4 dated Apr. 14, 2015, pp. 1-8.
Decision to Grant in counterpart European Application No. 14157971.4 dated Aug. 6, 2015, pp. 1-2.
Leotta, Matthew, Generic, Deformable Models for 3-D Vehicle Surveillance, May 2010, Doctoral Dissertation, Brown University, Providence RI, 248 pages.
Ward, Benjamin, Interactive 3D Reconstruction from Video, Aug. 2012, Doctoral Thesis, Univesity of Adelaide, Adelaide, South Australia, 157 pages.
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages.
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages.
Reisner-Kollmann, Irene; Anton L. Fuhrmann, Werner Purgathofer, Interactive Reconstruction of Industrial Sites Using Parametric Models, May 2010, Proceedings of the 26th Spring Conference of Computer Graphics SCCG ''10, 8 pages.
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages.
U.S. Appl. No. 14/519,179 for Dimensioning System With Multipath Interference Mitigation, filed Oct. 21, 2014 (Thuries et al.); 30 pages.
U.S. Appl. No. 14/264,173 for Autofocus Lens System for Indicia Readers, filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader, filed Aug. 6, 2014, (Todeschini); 32 pages.
U.S. Appl. No. 14/231,898 for Hand-Mounted Indicia-Reading Device with Finger Motion Triggering, filed Apr. 1, 2014 (Van Horn et al.); 36 pages.
U.S. Appl. No. 14/715,916 for Evaluating Image Values, filed May 19, 2015 (Ackley); 60 pages.
U.S. Appl. No. 14/513,808 for Identifying Inventory Items in a Storage Facility, filed Oct. 14, 2014 (Singel et al.); 51 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner, filed Sep. 10, 2014 (McCloskey et al.); 29 pages.
U.S. Appl. No. 14/531,154 for Directing an Inspector Through an Inspection, filed Nov. 3, 2014 (Miller et al.); 53 pages.
U.S. Appl. No. 29/525,068 for Tablet Computer With Removable Scanning Device, filed Apr. 27, 2015 (Schulte et al.); 19 pages.
U.S. Appl. No. 29/468,118 for an Electronic Device Case, filed Sep. 26, 2013 (Oberpriller et al.); 44 pages.

(56) References Cited

OTHER PUBLICATIONS

U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices, filed Apr. 1, 2015 (Yeakley et al.); 50 pages.
U.S. Appl. No. 14/257,364 for Docking System and Method Using Near Field Communication, filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone, filed Jun. 18, 2015 (Vargo et al); 16 pages.
U.S. Appl. No. 14/707,123 for Application Independent DEX/UCS Interface, filed May 8, 2015 (Pape); 47 pages.
U.S. Appl. No. 14/283,282 for Terminal Having Illumination and Focus Control, filed May 21, 2014 (Liu et al.); 31 pages.
U.S. Appl. No. 14/619,093 for Methods for Training a Speech Recognition System, filed Feb. 11, 2015 (Pecorari); 35 pages.
U.S. Appl. No. 29/524,186 for Scanner, filed Apr. 17, 2015 (Zhou et al.); 17 pages.
U.S. Appl. No. 14/705,407 for Method and System to Protect Software-Based Network-Connected Devices From Advanced Persistent Threat, filed May 6, 2015 (Hussey et al.); 42 pages.
U.S. Appl. No. 14/614,706 for Device for Supporting an Electronic Tool on a User's Hand, filed Feb. 5, 2015 (Oberpriller et al.); 33 pages.
U.S. Appl. No. 14/628,708 for Device, System, and Method for Determining the Status of Checkout Lanes, filed Feb. 23, 2015 (Todeschini); 37 pages.
U.S. Appl. No. 14/704,050 for Intermediate Linear Positioning, filed May 5, 2015 (Charpentier et al.); 60 pages.
U.S. Appl. No. 14/529,563 for Adaptable Interface for a Mobile Computing Device, filed Oct. 31, 2014 (Schoon et al.); 36 pages.
U.S. Appl. No. 14/705,012 for Hands-Free Human Machine Interface Responsive to a Driver of a Vehicle, filed May 6, 2015 (Fitch et al.); 44 pages.
U.S. Appl. No. 14/715,672 for Augumented Reality Enabled Hazard Display, filed May 19, 2015 (Venkatesha et al.); 35 pages.
U.S. Appl. No. 14/695,364 for Medication Management System, filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display, filed Mar. 20, 2015 (Todeschini); 37 pages.
U.S. Appl. No. 14/735,717 for Indicia-Reading Systems Having an Interface With a User's Nervous System, filed Jun. 10, 2015 (Todeschini); 39 pages.
U.S. Appl. No. 14/527,191 for Method and System for Recognizing Speech Using Wildcards in an Expected Response, filed Oct. 29, 2014 (Braho et al.); 45 pages.
U.S. Appl. No. 14/702,110 for System and Method for Regulating Barcode Data Injection Into a Running Application on a Smart Device, filed May 1, 2015 (Todeschini et al.); 38 pages.
U.S. Appl. No. 14/535,764 for Concatenated Expected Responses for Speech Recognition, filed Nov. 7, 2014 (Braho et al.); 51 pages.
U.S. Appl. No. 14/687,289 for System for Communication Via a Peripheral Hub, filed Apr. 15, 2015 (Kohtz et al.); 37 pages.
U.S. Appl. No. 14/747,197 for Optical Pattern Projector, filed Jun. 23, 2015 (Thuries et al.); 33 pages.
U.S. Appl. No. 14/674,329 for Aimer for Barcode Scanning, filed Mar. 31, 2015 (Bidwell); 36 pages.
U.S. Appl. No. 14/702,979 for Tracking Battery Conditions, filed May 4, 2015 (Young et al.); 70 pages.
U.S. Appl. No. 29/529,441 for Indicia Reading Device, filed Jun. 8, 2015 (Zhou et al.); 14 pages.
U.S. Appl. No. 14/747,490 for Dual-Projector Three-Dimensional Scanner, filed Jun. 23, 2015 (Jovanovski et al.); 40 pages.

U.S. Appl. No. 14/740,320 for Tactile Switch for a Mobile Electronic Device, filed Jun. 16, 2015 (Barndringa); 38 pages.
U.S. Appl. No. 14/695,923 for Secure Unattended Network Authentication, filed Apr. 24, 2015 (Kubler et al.); 52 pages.
U.S. Appl. No. 14/740,373 for Calibrating a Volume Dimensioner, filed Jun. 16, 2015 (Ackley et al.); 63 pages.
Search Report and Opinion in Related EP Application 15176943.7, dated Jan. 8, 2016, 8 pages.
European Search Report for related EP Application No. 15188440.0, dated Mar. 8, 2016, 8 pages.
United Kingdom Search Report in related application GB1517842.9, dated Apr. 8, 2016, 8 pages.
Great Britain Search Report for related Application On. GB1517843.7, dated Feb. 23, 2016; 8 pages.
European Partial Search Report for related EP Application No. 15190306.9, dated May 6, 2016, 8 pages.
Mike Stensvold, "get the Most Out of Variable Aperture Lenses", published on www.OutdoorPhotogrpaher.com; dated Dec. 7, 2010; 4 pages, [As noted on search report retrieved from URL: http://www.outdoorphotographer.com/gear/lenses/get-the-most-out-ofvariable-aperture-lenses.html on Feb. 9, 2016].
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134.
European extended Search report in related EP Application 13785171.3, dated Sep. 19, 2016, 8 pages.
El-Hakim et al, "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.
El-Hakim et al., "A Knowledge-based Edge/Object Measurement Technique", Retrieved from the Internet: URL: https://www.researchgate.net/profile/Sabry_El-Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.
Second Chinese Office Action in related CN Application No. 201520810685.6, dated Mar. 22, 2016, 5 pages, no references.
European Search Report in related EP Application No. 15190315.0, dated Apr. 1, 2016, 7 pages.
Second Chinese Office Action in related CN Application No. 2015220810562.2, dated Mar. 22, 2016, 5 pages. English Translation provided [No references].
European Search Report for related Application EP 15190249.1, dated Mar. 22, 2016, 7 pages.
Second Chinese Office Action in related CN Application No. 201520810313.3, dated Mar. 22, 2016, 5 pages. English Translation provided [No references].
European Search Report for related EP Application No. 16152477.2, dated May 24, 2016, 8 pages.
European Extended search report in related EP Application No. 15190306.9, dated Sep. 9, 2016, 15 pages.
Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.
Padzensky, Ron; "Augmera; Gesture Control", Dated Apr. 18, 2015, 15 pages.
Grabowski, Ralph; "New Commands in AutoCADS 2010: Part 11 Smoothing 3D Mesh Objects" dated 2011, 6 pages.
Theodoropoulos, Gabriel; "Using Gesture Recognizers to Handle Pinch, Rotate, Pan, Swipe, and Tap Gestures" dated Aug. 25, 2014, 34 pages.
Extended European Search Report in related EP Application No. 16175410.0, dated Dec. 13, 2016, 5 pages.
European Extended Search Report in related EP Application No. 16190017.0, dated Jan. 4, 2017, 6 pages.
European Extended Search Report in Related EP Application No. 16172995.9, dated Aug. 22, 2016, 11 pages.
European Search Report from related EP Application No. 16168216.6, dated Oct. 20, 2016, 8 pages.

(56) References Cited

OTHER PUBLICATIONS

United Kingdom combined Search and Examination Report in related GB Application No. 1607394.2, dated Oct. 19, 2016, 7 pages.
European Extended Search Report in related EP Application No. 16173429.8, dated Dec. 1, 2016, 8 pages.
European Examination report in related EP Application No. 14181437.6, dated Feb. 8, 2017, 5 pages.
Wikipedia, "Microlens", Downloaded from https://en.wikipedia.org/wiki/Microlens, pp. 3.
Fukaya et al., "Characteristics of Speckle Random Pattern and Its Applications", pp. 317-327, Nouv. Rev. Optique, t.6, n. 6. (1975).
European extended search report in related EP Application 16190833.0, dated Mar. 9, 2017, 8 pages.
United Kingdom Combined Search and Examination Report in related Application No. GB1620676.5, dated Mar. 8, 2017, 6 pages.
European Exam Report in related , EP Application No. 16168216.6, dated Feb. 27, 2017, 5 pages.
European Exam Report in related EP Application No. 15176943.7, dated Apr. 12, 2017, 6 pages.
European Exam Report in related EP Application No. 15188440.0, dated Apr. 21, 2017, 4 pages.
Ralph Grabowski, "Smothing 3D Mesh Objects," New Commands in AutoCAD 2010: Part 11, Examiner Cited art in related matter Non Final Office Action dated May 19, 2017; 6 pages.
Chinese Notice of Reexamination in related Chinese Application 201520810313.3, dated Mar. 14, 2017, English Computer Translation provided, 7 pages.
Extended European search report in related EP Application 16199707.7, dated Apr. 10, 2017, 15 pages.
Ulusoy et al., One-Shot Scanning using De Bruijn Spaced Grids, 2009 IEEE 12th International Conference on Computer Vision Workshops, ICCV Workshops, 7 pages [Cited in EP Extended search report dated Apr. 10, 2017].
Thorlabs, Examiner Cited NPL in Advisory Action dated Apr. 12, 2017 in related commonly owned application, downloaded from https://www.thorlabs.com/newgrouppage9.cfm?objectgroup_id=6430, 4 pages.
Eksma Optics, Examinder Cited NPL in Advisory Action dated Apr. 12, 2017 in related commonly owned application, downloaded from http://eksmaoptics.com/optical-systems/f-theta-lenses/f-theta-lens-for-1064-nm/, 2 pages.
Sill Optics, Examiner Cited NPL in Advisory Action dated Apr. 12, 2017 in related commonly owned application, http://www.silloptics.de/1/products/sill-encyclopedia/laser-optics/f-theta-lenses/, 4 pages.

\* cited by examiner

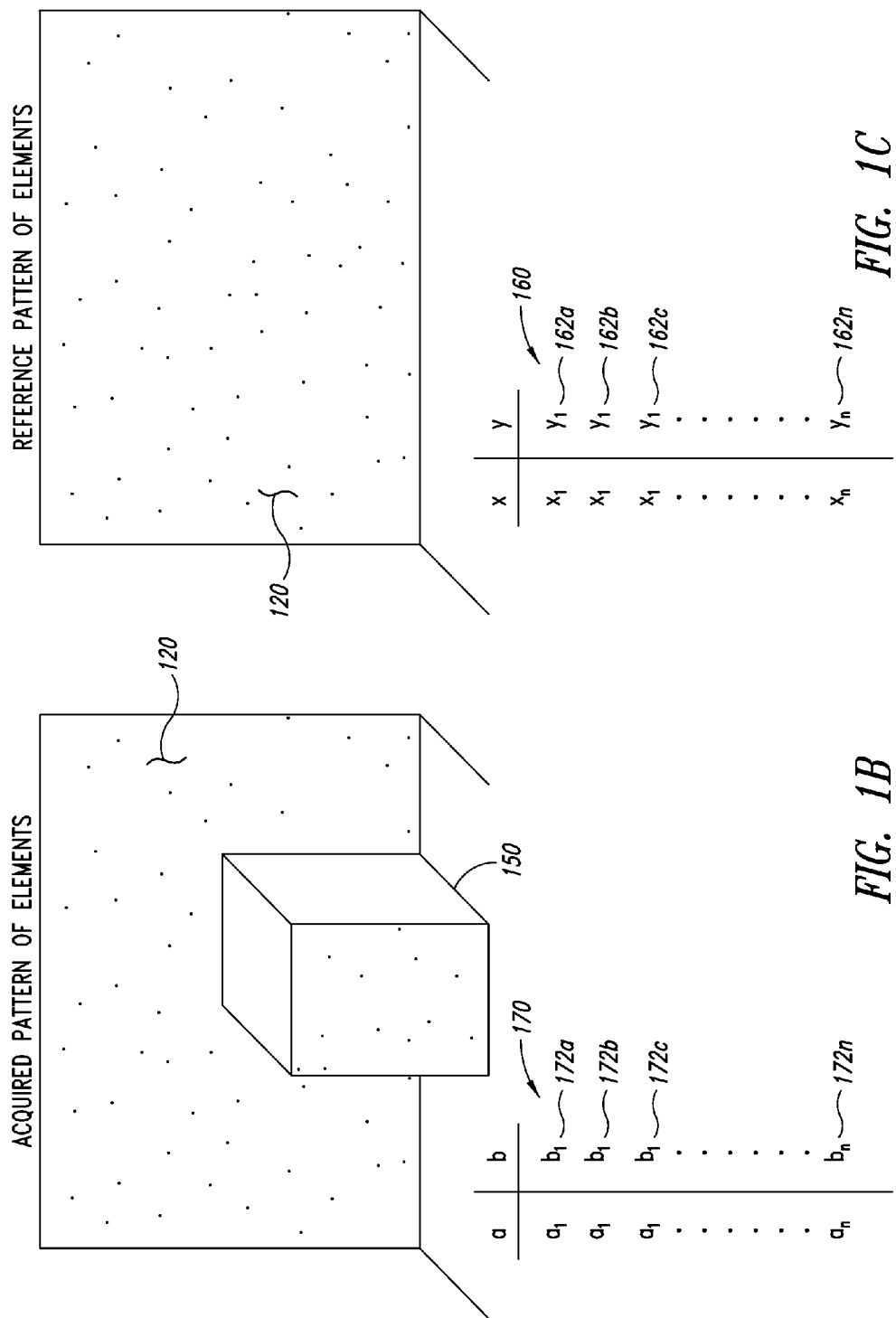

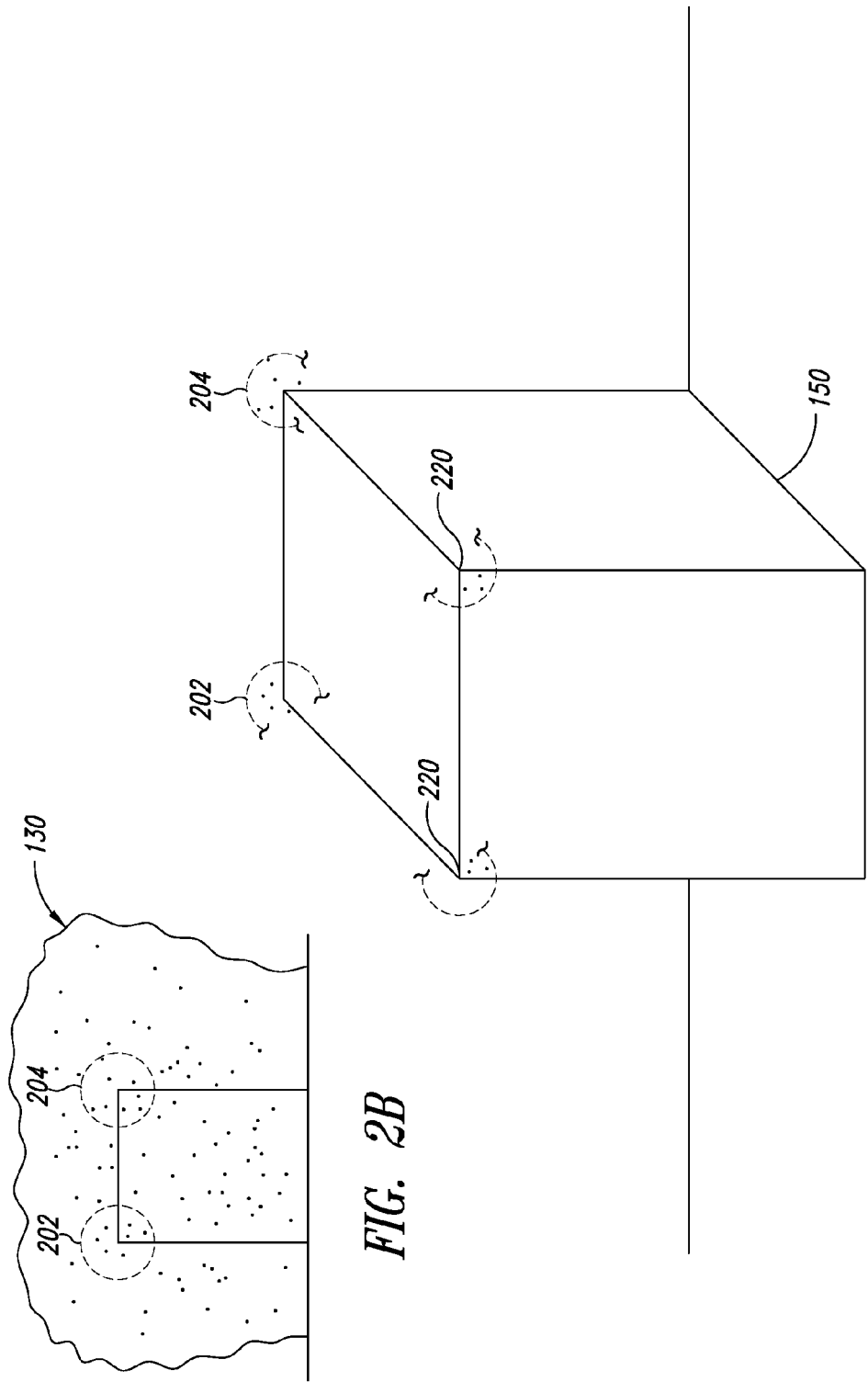

SYSTEMS AND METHODS FOR ENHANCING DIMENSIONING

CROSS-REFERENCE TO RELATED APPLICATION

The present application claims the benefit of U.S. patent application Ser. No. 13/799,762 for Systems and Methods for Enhancing Dimensioning, For Example Volume Dimensioning filed Mar. 13, 2013 (and published Sep. 18, 2014 as U.S. Patent Application Publication No. 2014/0267609), now U.S. Pat. No. 9,080,856. Each of the foregoing patent application, patent publication, and patent is hereby incorporated by reference in its entirety.

FIELD OF TECHNOLOGY

This disclosure generally relates to non-contact dimensioning systems and methods for determining dimensions and/or volume of objects.

BACKGROUND

Dimensioning systems are useful for providing dimensional and volumetric data related to three-dimensional objects disposed within a field-of-view of the dimensioning system. Such dimensional and volumetric information is useful for example, in providing consumers with accurate shipping rates based on the actual size and volume of the object being shipped. Additionally, the dimensioning system's ability to transmit parcel data immediately to a carrier can assist the carrier in selecting and scheduling appropriately sized vehicles based on measured cargo volume and dimensions. Finally, the ready availability of dimensional and volumetric information for all the objects within a carrier's network assists the carrier in ensuring optimal use of available space in the many different vehicles, containers, and/or warehouses used in local, interstate, and international commerce.

A wide variety of computing devices are used within the shipping industry. For example, personal computers used as multi-tasking terminals in small storefront packing and shipping establishments. Also, for example, dedicated self-service shipping kiosks found in many post offices. As a further example, dedicated handheld scanners are frequently used as mobile terminals by many international shipping corporations. The wide variety of form factors found in the shipping industry are quite diverse, yet all rely upon providing accurate information, such as parcel dimensions and volume, to both the user in order to provide accurate shipping rates and to the carrier in order to accurately forecast shipping volumes.

A number of volume dimensioning systems rely upon the use of structured light. By projecting a structured light pattern into a three-dimensional space containing at least one object, the shift in position (i.e., parallax) of the structured light within the three-dimensional space may be used to determine one or more dimensions of the object. The comparison between the structured light pattern present in the acquired image containing the object and a reference image to determine the parallax shift and consequently the volume dimensions of the object is performed graphically, often by comparing portions of the acquired image to portions of the entire reference image to determine a pattern "match." Such image intensive processing requires significant computing resources and speed to provide response times expected for use in commerce and industry.

Structured light patterns can take many forms, including an outwardly apparent random pattern of elements (e.g., visible or invisible electromagnetic radiation in the form of "dots" or "spots") which is, to the contrary, highly structured. The arrangement of elements within the pattern is such that any group including a defined number of elements (e.g., three or more) is unique among all other groups containing an identical number of elements within in the pattern. Thus in some element patterns, any group of seven elements is unique among all groups of seven elements appearing in the pattern.

Projecting such a pattern of elements into a three-dimensional space that includes an object for volume dimensioning permits the determination of the volume dimension of the object based on the parallax shift that occurs in at least a portion of the elements in the pattern when the acquired image data is compared to reference data of the three-dimensional space without the object. Determination of parallax shift between the acquired image of the three-dimensional space with an object and containing the pattern of elements and a reference image containing the pattern of elements is a two step process in which corresponding elements in the acquired image and the reference image are identified. After corresponding elements in the reference image and the acquired image are identified, the parallax shift between the elements can be calculated, and dimensional information of the object obtained.

The identification of corresponding elements in the reference image and the acquired image may be performed graphically using a processor-based device to sequentially compare a portion of the acquired image with portions of the reference image until a "match" between the patterns is detected by the processor. Such graphical comparisons are generally computationally intensive, requiring the use of either high speed processors or multiple processors to reduce the time required to match the pattern in the acquired image with the pattern in the reference image to a level acceptable for use in industry and commerce.

SUMMARY

It has been advantageously found that if element location data is extracted from the acquired image and compiled as numerical data into a coordinate data list, such a list of numerical element location data may be more expeditiously compared to numerical reference element location data in a similar reference data list. Such comparisons of numerical lists are well within the capabilities of lower speed processors such as those found in many portable electronic devices. Thus, the use of a coordinate data list including numerical data indicative of element locations in an element pattern obtained from an acquired image of a three-dimensional space containing an object and a reference data list including numerical data indicative of reference element locations in a reference element pattern can speed the volume dimensioning process and advantageously permit the use of portable electronic devices to provide highly accurate volume dimensioning data.

Additional enhancements in speed and efficiency of pattern matching are obtained by sorting the coordinate data list and/or the reference data list. Another enhancement to the speed and efficiency of pattern matching is obtained by comparing a limited number of groups of pattern elements, each group including a sufficient number of elements to form a unique set of elements within the acquired image to the reference data list. Such a comparison between coordinate data associated with element locations in a group including a limited number of elements and the coordinate data of reference elements in the reference data list can be performed using patterned searches. For example, a search focusing only on coordinate locations of reference elements within the reference data list that are proximate a reference element matching an element included in a group of elements may beneficially take advantage of the fact that elements included in the group of elements are often found to match reference elements in close proximity within the reference data list.

Another enhancement in speed and efficiency of pattern matching is obtained by converting the coordinate locations of acquired elements included in a particular group into a locally referenced locations in which the locations of all of the elements included in the particular group are locally referenced to a single element included in the respective group. For example, an angle and a distance may be used to reference the location of each of the elements included in a group to a single element in the respective group. The coordinate data of the reference elements included in the reference data list may be converted to a similar locally-referenced coordinate system. The unique angle and distance data for each group can then be compared with reference angle and distance data for the reference elements included in the reference data list. In such an instance, determining the correspondence between the reference element in the group (i.e., the "origin," for the locally referenced coordinate system) and a reference element in the reference data list effective matches every element in the group with a corresponding reference element in the reference data list.

An enhancement in dimensional accuracy may be obtained by more precisely determining the center of intensity of each element appearing in the pattern in the acquired image data prior to determining the coordinates of the respective element. Such a center of intensity may be determined by analyzing the grayscale intensity distribution of each element in the acquired image data to identify a "center of intensity" of the element and associating the coordinate location of the element with the identified center of intensity of the respective element.

A portable structured light dimensioning system to determine a volume dimension of an object may be summarized as including an image acquisition device to acquire image data representative of at least an element pattern projected into a three dimensional space that includes at least one object; at least one processor communicably coupled to the image acquisition device; and at least one nontransitory storage medium communicably coupled to the at least one processor and having stored therein at least one set of machine executable instructions that when executed by the at least one processor cause the at least one processor to: determine coordinate data associated with each element location in at least a portion of the element pattern present in the acquired image data; generate a number of coordinate data lists, each including coordinate data associated with at least three element locations in the acquired image data; for each coordinate data list: compare the coordinate data associated with each of the at least three element locations in the acquired image data with a reference data list including reference coordinate data associated with reference element locations in a reference element pattern; and select for each of the at least three element locations, a corresponding reference element location in the reference element pattern; and determine a spatial shift between the coordinate data associated with each of the at least three element locations in the acquired image data and the coordinate data associated with the respective corresponding reference element location in the reference element pattern.

The machine executable instructions, when executed by the at least one processor, may further cause the at least one processor to: for each coordinate data list, compare the coordinate data associated with each of the at least three element locations in the acquired image data with a reference data list by performing for the coordinate data associated with each of the at least three element locations, at least one of: a top-to-bottom search, or, a bottom-to-top search of the reference data list to compare the coordinate data associated with the respective element location with coordinate data associated with each reference element location in the reference data list.

The machine executable instructions, when executed by the at least one processor, may further cause the processor to: for each coordinate data list, sort the coordinate data using a defined sort pattern to provide a respective ordered coordinate data list.

The machine executable instructions, when executed by the at least one processor, may further cause the at least one processor to: for each ordered coordinate data list perform at least one of a top-to-bottom search or a bottom-to-top search of the reference data list to compare the coordinate data associated with a first element location in the ordered coordinate data list with coordinate data associated with each reference element location in the reference data list; and for coordinate data in the ordered coordinate data list associated with each remaining element location, perform at least one of an upward search, a downward search, or an alternating upward/downward search about coordinate data associated with a reference element in the reference data list corresponding to coordinate data associated with an immediately preceding element location.

The machine executable instructions, when executed by the at least one processor, may further cause the at least one processor to: for each ordered coordinate data list perform at least one of a top-to-bottom search or a bottom-to-top search of an ordered reference data list to compare the coordinate data associated with a first element location in the ordered coordinate data list with coordinate data associated with each reference element location in the ordered reference data list; and for coordinate data in the ordered coordinate data list associated with each remaining element location, perform at least one of an upward search, a downward search, or an alternating upward/downward search about coordinate data associated with a reference element in the ordered reference data list corresponding to coordinate data associated with an immediately preceding remaining element location.

The machine executable instructions, when executed by the at least one processor, may further cause the processor to: generate an ordered coordinate data list about each of a number of points of interest in the acquired image data to provide the number of ordered coordinate data lists, each ordered coordinate data list including coordinate data associated with each of at least three element locations about each respective point of interest.

The machine executable instructions, when executed by the at least one processor, may further cause the at least one processor to: accept a number of user inputs, each of the user inputs corresponding to one of the number of points of interest in the acquired image data.

The machine executable instructions, when executed by the at least one processor, may further cause the at least one processor to: autonomously determine each of the number of points of interest in the acquired image data.

The machine executable instructions, when executed by the at least one processor, may further cause the processor to: for each ordered coordinate data list, convert the coordinate data associated with the at least three element locations in the acquired image data to a second, locally-referenced coordinate system that relates the coordinate data associated a first of the at least three elements included the respective ordered coordinate data list to the coordinate data associated with each of the other of the at least three elements included in the respective ordered coordinate data list to provide a respective ordered, locally referenced, coordinate data list.

The machine executable instructions, when executed by the at least one processor, may further cause the at least one processor to: for each ordered, locally referenced, coordinate data list perform at least one of a top-to-bottom search or a bottom-to-top search of a locally-referenced, reference data list in which the coordinate data associated with each reference element is related to coordinate data associated with a number of neighboring reference elements in the reference pattern, to compare the locally-referenced coordinate data associated with the first of the at least three elements in the ordered, locally-referenced, coordinate data list with coordinate data associated with each reference element location in the locally-referenced, reference data list.

The machine executable instructions, when executed by the at least one processor, may further cause the processor to: determine a center of intensity of element locations in at least a portion of the element pattern present in the acquired image data; and determine coordinate data corresponding to the determined center of intensity of the element locations in at least a portion of the element pattern present in the acquired image data.

The machine executable instructions, when executed by the at least one processor, may further cause the processor to: determine a center of intensity of element locations in at least a portion of the element pattern present in the acquired image data using grayscale values associated with each of the respective element locations.

The machine executable instructions, when executed by the at least one processor, may further cause the at least one processor to: determine a respective distance between the image acquisition device and each of the elements in at least a portion of the pattern of elements incident upon the at least one object positioned in the three-dimensional space.

The machine executable instructions, when executed by the at least one processor, may further cause the at least one processor to: determine a respective volume dimension associated with the at least one object using the determined respective distances between the image acquisition device and each of the elements in at least a portion of the pattern of elements incident upon the at least one object positioned in the three-dimensional space.

A structured light dimensioning method to determine a volume dimension of an object may be summarized as including determining by at least one processor coordinate data corresponding to element locations in at least a portion of the element pattern present in acquired image data provided by at least one communicably coupled image capture device; generating by the at least one processor a number of coordinate data lists, each coordinate data list including coordinate data associated with at least three element locations in the acquired image data; storing each of the number of coordinate data lists in at least one nontransitory storage media communicably coupled to the at least one processor; for each coordinate data list: comparing by the at least one processor the coordinate data associated each of the at least three element locations in the acquired image data with a reference data list stored in at least one nontransitory storage media communicably coupled to the at least one processor, the reference data list including reference coordinate data associated with reference element locations in a reference element pattern; selecting by the at least one processor, for each of the at least three element locations, a corresponding reference element location in the reference element pattern; and determining by the at least one processor a spatial shift between the coordinate data associated with each of the at least three element locations in the acquired image data and the coordinate data associated with the respective corresponding reference element location in the reference element pattern.

Comparing by the at least one processor the coordinate data associated each of the at least three element locations in the acquired image data with a reference data list may include comparing by the at least one processor the coordinate data associated each of the at least three element locations in the acquired image data with a reference data list by performing for the coordinate data associated with each of the at least three element locations, at least one of a top-to-bottom search or a bottom-to-top search of the reference data list to compare the coordinate data associated with the respective element location with coordinate data associated with each reference element location in the reference data list.

The method may further include for each coordinate data list, sorting by the at least one processor the coordinate data using a defined sort pattern to provide a respective ordered coordinate data list.

The method may further include for each ordered coordinate data list, performing by the at least one processor at least one of a top-to-bottom search or a bottom-to-top search of the reference data list to compare the coordinate data associated with a first element location in the ordered coordinate data list with coordinate data associated with each reference element location in the reference data list; and for coordinate data in the ordered coordinate data list associated with each remaining element location, performing by the at least one processor at least one of an upward search, a downward search, or an alternating upward/downward search about coordinate data associated with a reference element in the reference data list corresponding to coordinate data associated with an immediately preceding element location.

The method may further include for each ordered coordinate data list, performing by the at least one processor at least one of a top-to-bottom search or a bottom-to-top search of an ordered reference data list to compare the coordinate data associated with a first element location in the ordered coordinate data list with coordinate data associated with each reference element location in the ordered reference data list; and for coordinate data in the ordered coordinate data list associated with each remaining element location, performing by the at least one processor at least one of an upward search, a downward search, or an alternating upward/downward search about coordinate data associated with a reference element in the ordered reference data list corresponding to coordinate data associated with an immediately preceding remaining element location.

Generating by the at least one processor a number of coordinate data lists may include generating by the at least one processor, an ordered coordinate data list proximate each of a number of points of interest in the acquired image data to provide the number of ordered coordinate data lists, each ordered coordinate data list including coordinate data associated with each of at least three element locations about each respective point of interest.

The method may further include accepting by the at least one processor, a number of user inputs provided via at least one user interface communicably coupled to the at least one processor, each of the user inputs corresponding to one of the number of points of interest in the acquired image data.

The method may further include autonomously determining by the at least one processor, each of the number of points of interest in the acquired image data.

The method may further include for each ordered coordinate data list, converting by the at least one processor, the coordinate data associated with the at least three element locations in the acquired image data to a second, locally-referenced coordinate system that relates the coordinate data associated a first of the at least three elements included the respective ordered coordinate data list to the coordinate data associated with each of the other of the at least three elements included in the respective ordered coordinate data list to provide a respective ordered, locally referenced, coordinate data list.

Comparing by the at least one processor the coordinate data associated each of the at least three element locations in the acquired image data with the reference data list stored in at least one nontransitory storage media communicably coupled to the at least one processor may include for each ordered, locally referenced, coordinate data list performing by the at least one processor at least one of a top-to-bottom search or a bottom-to-top search of a locally-referenced, reference data list in which the coordinate data associated with each reference element is related to coordinate data associated with a number of neighboring reference elements in the reference pattern, to compare the locally-referenced coordinate data associated with the first of the at least three elements in the ordered, locally-referenced, coordinate data list with coordinate data associated with each reference element location in the locally-referenced, reference data list.

The method may further include determining by the at least one processor a center of intensity of element locations in at least a portion of the element pattern present in the acquired image data.

Generating by the at least one processor a number of coordinate data lists, each coordinate data list including coordinate data associated with at least three element locations in the acquired image data may include generating by the at least one processor a number of coordinate data lists, each coordinate data list including coordinate data corresponding to the determined center of intensity of the at least three element locations in the acquired image data.

Determining by the at least one processor a center of intensity of element locations in at least a portion of the element pattern present in the acquired image data may include determining by the at least one processor the center of intensity of element locations in at least a portion of the element pattern present in the acquired image data using a number of grayscale values associated with each of the respective element locations.

The method may further include determining by the at least one processor a respective distance between the image acquisition device and each of the elements in at least a portion of the pattern of elements incident upon the at least one object positioned in the three-dimensional space.

The method may further include determining by the at least one processor a respective volume dimension associated with the at least one object using the determined respective distances between the image acquisition device and each of the elements in at least a portion of the pattern of elements incident upon the at least one object positioned in the three-dimensional space.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 1B is a schematic diagram of an example element pattern projected into the three-dimensional space which includes an object and an associated Cartesian coordinate data list including coordinate data associated with the location each element in the pattern of elements, according to one illustrated embodiment.

FIG. 1C is a schematic diagram of an example reference element pattern projected into a three-dimensional space and an associated reference data list including Cartesian coordinate data associated with the location of each reference element, according to one illustrated embodiment.

FIG. 2B is a front elevational view of a portion of an example pattern of elements projected onto an object in a three-dimensional space and including two groups of elements, each containing a number of elements having a unique spatial arrangement among the pattern of elements about two identified points of interest, according to one illustrated embodiment.

FIG. 2C is a perspective view of a portion of the example pattern of elements in FIG. 2B projected onto the object in the three-dimensional space and including two groups of elements, each containing a number of elements having a unique spatial arrangement among the pattern of elements about the two identified points of interest, according to one illustrated embodiment.

DETAILED DESCRIPTION

Figure 1A:
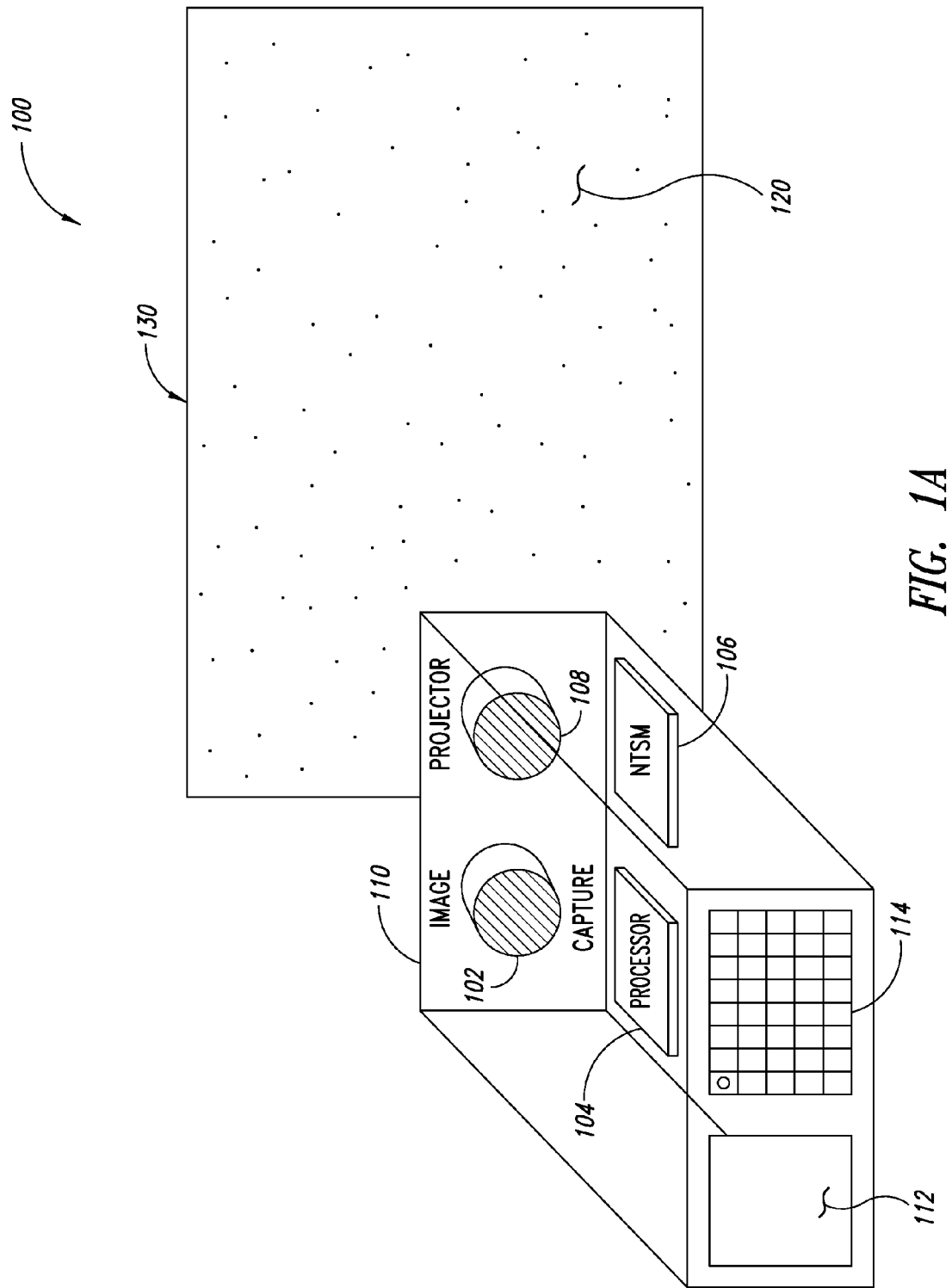
FIG. 1A is a perspective view of an example dimensioning system using a structured light pattern including a number of elements projected into a three-dimensional space, according to one illustrative embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with sources of electromagnetic energy, operative details concerning image sensors, cameras, structured light, and detailed architecture and operation of the imaging system have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

As used herein, the term "element" refers to any projected sensible (e.g., visible light) or detectable (e g, infrared) or otherwise discernible electromagnetic radiation forming at least a portion of a larger pattern. Elements can have any shape or geometry including shapes and geometries that are altered or varied in one or more dimensions as a function of distance from the projection device providing the electromagnetic radiation. In at least some instances, such elements may be variously referred to as "dots," "points," or "spots."

As used herein, the term "pattern of elements" and "reference pattern of elements" refers to a pattern of elements appearing outwardly random, yet is highly structured and reproducible such that any group of a defined number of elements in the pattern provides a unique spatial geometry that is not reproduced elsewhere in the overall pattern by any other grouping of a same number of elements. In some instances, the number of elements forming the unique spatial geometry may number three or more. A "reference pattern of elements" or a "reference element pattern" refers to the case where the pattern of elements is projected into a baseline three-dimensional space having a known spatial geometry to provide a pattern of elements having a known distance between the projection device and each of the elements forming the reference pattern of elements. A common element pattern is used to provide both the reference element pattern and the pattern of elements projected on the object positioned in the three-dimensional space.

FIG. 1A shows a volume dimensioning system 100 including an image acquisition device 102 having a field-of-view, at least one processor communicably coupled to the image acquisition device, at least one non-transitory storage medium 106, and at least one projection device 108 to project an element pattern 130 into a three-dimensional space 120, according to one illustrated embodiment. FIG. 1B shows an image of an object 150 disposed in the three-dimensional space 120 with at least a portion of an element pattern 130 projected on the object 150 and the remainder of the element pattern 130 projected into the three-dimensional space 120 falling within the field-of-view of the image acquisition device 102 and a number of coordinate data lists 170 each including numerical data corresponding to the Cartesian coordinates 172a-172n (collectively "Cartesian coordinates 172") of each of the reference elements included in the respective coordinate list 170, according to one illustrated embodiment. FIG. 1C shows an image of the element pattern 130 projected into the three-dimensional space 120 without an object 150 present, to provide a reference element pattern 140 and a reference data list 160 including numerical data corresponding to the Cartesian coordinates 162a-162n (collectively "Cartesian coordinates 162") of each of the reference elements included in the reference element pattern 140, according to an illustrated embodiment.

The volume dimensioning system may optionally include one or more output devices 112 and one or more input devices 114 communicably coupled to the at least one processor 104. The image acquisition device 102 can acquire image data representative of the three-dimensional space 120 and any objects 150 placed therein that lie within the field-of-view of the image acquisition device 102. The image data acquired by the image acquisition device 102 can include at least a portion of the element pattern 130 projected into the three-dimensional space 120.

The volume dimensioning system 100 determines the distance to objects placed within the three-dimensional space 120 by comparing the element pattern 130 in the acquired image with the element pattern 130 in the reference element pattern 140. By aligning the elements included in the element pattern 130 in the acquired image data with corresponding elements in the reference element pattern 140, shifts in coordinate locations of corresponding elements in the acquired image data and the reference image data can be used to determine a distance between the projection device 108 and each of the respective elements in the element pattern 130.

The image acquisition device 102 can include any number or combination of systems or devices suitable for providing data indicative of the three-dimensional space 120 and any objects placed therein. The image acquisition device 102 is used to acquire image data representative of a scene in the field-of-view of the image acquisition device. When the projection device 108 projects the element pattern 130 into the three-dimensional space 120, the image data acquired by the image acquisition device includes data indicative of the location and optionally the intensity of the elements included in the element pattern 130. Such image data may be generated using an image acquisition device 102 sensitive to incident electromagnetic radiation in the visible electromagnetic spectrum (e.g., wavelengths between about 360 nanometers ("nm") and about 700 nm) when the element pattern 130 is projected in the visible electromagnetic spectrum. Such image data may be generated using an image acquisition device 102 sensitive to incident, invisible, portions of the electromagnetic spectrum, such as the infrared or near-infrared portions of the electromagnetic spectrum (e.g., wavelengths between about 700 nm and about 1000 nm) when the element pattern 130 is projected in an invisible portion of the electromagnetic spectrum.

In some implementations, the image acquisition device 102 may operate in at least a portion of the visible electromagnetic spectrum and in at least a portion of the invisible electromagnetic spectrum (e.g., a charge-coupled device or "CCD" sensor having an operating sensitivity that falls within portions of both the visible and invisible electromagnetic spectrum at wavelengths of from about 360 nm to about 800 nm). Such an image capture device advantageously permits the capture of an element pattern 130 projected in an invisible portion of the electromagnetic spectrum (e.g., near-infrared) while contemporaneously capturing image data in the visible spectrum representative of the field-of-view of the image acquisition device.

In at least some implementations, the image acquisition device 102 may include one or more systems or devices for enhancing or otherwise altering the acquired image data. For example, the image acquisition device 102 may include one or more filters or signal processors to remove or otherwise separate image data representative of the visible portion of the electromagnetic spectrum from image data representative of the invisible portion of the electromagnetic spectrum in at least a portion of the acquired image data.

All or a portion of the acquired image data provided by the image acquisition device 102 can be communicated from the image acquisition device 102 to the at least one processor 104 or the at least one non-transitory storage medium 106. One or more machine executable instruction sets can cause the at least one processor 106 to extract or otherwise separate the portion of the acquired image data corresponding to each of the elements in the element pattern 130. In at least some instances, the machine executable instructions may further cause the at least one processor 104 to determine coordinate data (e.g., Cartesian coordinate data) associated with each element location in at least a portion of the element pattern 130 present in the acquired image data.

In at least some instances, the machine executable instructions may further cause the at least one processor 104 to organize or form the Cartesian coordinates 172 associated with the location of each of the elements in the acquired image data into a number of coordinate data lists 170. Each of the number of coordinate data lists 170 can include a single-dimensional or a two-dimensional array containing numerical data corresponding to the Cartesian coordinates 172 for each of the elements included in the respective coordinate data list 170. In some implementations, the machine executable instructions may further cause the at least one processor 104 to organize or form the Cartesian coordinates 172 corresponding to the locations all of the elements in the acquired image data into a single coordinate data list 170. The at least one processor 104 may store or otherwise retain the number of coordinate data lists 170 in a non-transitory storage media partially or completely within the at least one processor 104, in the at least one non-transitory storage medium 106, or any combination thereof.

One or more sets of machine executable instructions cause the at least one processor 104 to perform a comparison of the numerical data representative of the element locations in each of the number of coordinate data lists 170 with the numerical data representative of the reference element locations in the reference data list 160. The comparison can be performed by the at least one processor 104 as a search of the reference data list 160 for corresponding points appearing in each of the number of coordinate data lists. Advantageously, by performing a numerical comparison of the reference data list 160 with each of the number of coordinate data lists 170, the need for computation resource intensive graphical comparison of acquired image data is eliminated, thereby permitting the comparison using a less powerful, slower processor 106 such as those found in many portable or handheld electronic devices.

For example, a low resolution image acquisition device 102 may provide an acquired image having 1 to 3 megapixels of data. Such an image generates an image data file of at least 1 to 3 megabytes. In contrast, the element pattern 130 includes about 11,000 elements in the acquired image data. By extracting only coordinate data corresponding to the locations of the elements in the element pattern 130 in the acquired image data, the file size may be reduced by up to 100 times. Comparing a coordinate data list containing numerical data corresponding to the coordinate locations of 11,000 elements in the element pattern 130 with a reference data list containing a comparable quantity of numerical data corresponding to the coordinate locations of 11,000 elements in the reference element pattern 140 significantly reduces the necessary computing resources, particularly when compared to a graphical search routine using a 1 to 3 megapixel image.

The at least one processor 104 can compare numerical data representative of the element locations in each of the coordinate data lists 170 is against numerical data representative of the reference element location in a reference data list 160. The at least one processor 104 can then identify reference elements in the reference data list 160 corresponding to each of the elements included in each of the number of coordinate data lists 170. Based on the identified correspondence between elements in the element pattern 130 and reference elements in the reference element pattern 140, the at least one processor 104 can determine the spatial shift between every acquired element and the corresponding reference element.

The search of the reference data list can be performed using any search strategy including a "top-down" search strategy in which numerical data representative of the element locations in each of the coordinate data lists 170 is sequentially compared top-to-bottom to numerical data representative of the reference element locations in a reference data list 160. The search of the reference data list 160 can be performed using a "bottom-up" search strategy in which numerical data representative of the element locations in each of the coordinate data lists 170 is sequentially compared bottom-to-top to numerical data representative of the reference element locations in a reference data list 160. Those of ordinary skill in the computer programming arts will readily appreciate the wide variety of alternative search strategies which may also be used to compare numerical data representative of the element locations in each of the coordinate data lists 170 is against numerical data representative of the reference element locations in a reference data list 160.

The dimensioning system sensor(s) 114 can take a large variety of forms (e.g., digital, analog, still image, molding images) and can be formed from or contain any number of image capture or collection elements, for example picture elements or "pixels." For example, the dimensioning system sensor(s) 114 can have between 1,000,000 pixels (1 MP) and 100,000,000 pixels (100 MP). The dimensioning system sensor(s) 114 can include any number of current or future developed image sensing devices, collectors, or systems that include, but are not limited to, one or more complementary metal-oxide semiconductor ("CMOS") image sensors or one or more charge-coupled device ("CCD") image sensors.

Data is communicated from the image acquisition device 102 to the at least one processor 104 and the at least one non-transitory storage media 106 via a number of serial or parallel data buses (not shown in FIG. 1A). The non-transitory storage media 106 can be any form of data storage device including, but not limited to, optical data storage, electrostatic data storage, electroresistive data storage, magnetic data storage, and/or molecular data storage devices. All or a portion of the non-transitory storage media 106 may be disposed within the at least one processor 104, for example in the form of a cache, registers, or similar non-transitory memory structure capable of storing data or machine-readable instructions executable by the at least one processor 104.

The at least one non-transitory storage media 106 can have any data storage capacity from about 1 megabyte (1 MB) to about 3 terabytes (3 TB). Two or more storage devices may be used to provide all or a portion of the non-transitory storage media 106. For example, in some embodiments, the non-transitory storage media 106 can include a non-removable portion including a non-transitory, electrostatic, volatile storage medium and a removable portion such as a Secure Digital (SD) card, a compact flash (CF) card, a Memory Stick, or a universal serial bus ("USB") storage device.

The at least one processor 104 can execute one or more machine readable instruction sets that are stored in whole or in part in the at least one non-transitory storage media 106. The machine executable instruction set(s) can include instructions related to basic functional aspects of the at least one processor 104, for example data transmission and storage protocols, communication protocols, input/output ("I/O") protocols, USB protocols, and the like. Machine executable instruction sets related to all or a portion of the dimensioning functionality of the volume dimensioning system 100 and intended for execution by the at least one processor 104 while in calibration or pre-run time mode, in run time mode, or combinations thereof may also be stored within the at least one non-transitory storage media 106, the at least one processor 104, or any combination thereof. Additional volume dimensioning system 100 functionality may also be stored in the form of machine executable instruction set(s) in the at least one non-transitory storage media 106. Such functionality may include system security settings, system configuration settings, language preferences, dimension and volume preferences, and the like.

Data is transferred between the at least one non-transitory storage media 106 and the at least one processor 104 via serial or parallel bi-directional data buses (not shown in FIG. 1A). The at least one processor 104 can include any device comprising one or more cores or independent central processing units that are capable of executing one or more machine executable instruction sets. The at least one processor 104 can, in some embodiments, include a general purpose processor such as a central processing unit ("CPU") including, but not limited to, an Intel® Atom® processor, an Intel® Pentium®, Celeron®, or Core 2® processor, and the like. In other embodiments the at least one processor 104 can include a system-on-chip ("SoC") architecture, including, but not limited to, the Intel® Atom® System on Chip ("Atom SoC") and the like. In other embodiments, at least one processor 104 can include a dedicated processor such as an application specific integrated circuit ("ASIC"), a programmable gate array ("PGA" or "FPGA"), a digital signal processor ("DSP"), or a reduced instruction set computer ("RISC") based processor. Where the volume dimensioning system 100 is a battery-powered portable system, the at least one processor 104 can include low power consumption processor(s), for example Intel® Pentium M®, or Celeron M® mobile system processors or the like, to extend the system battery life.

Figure 2A:
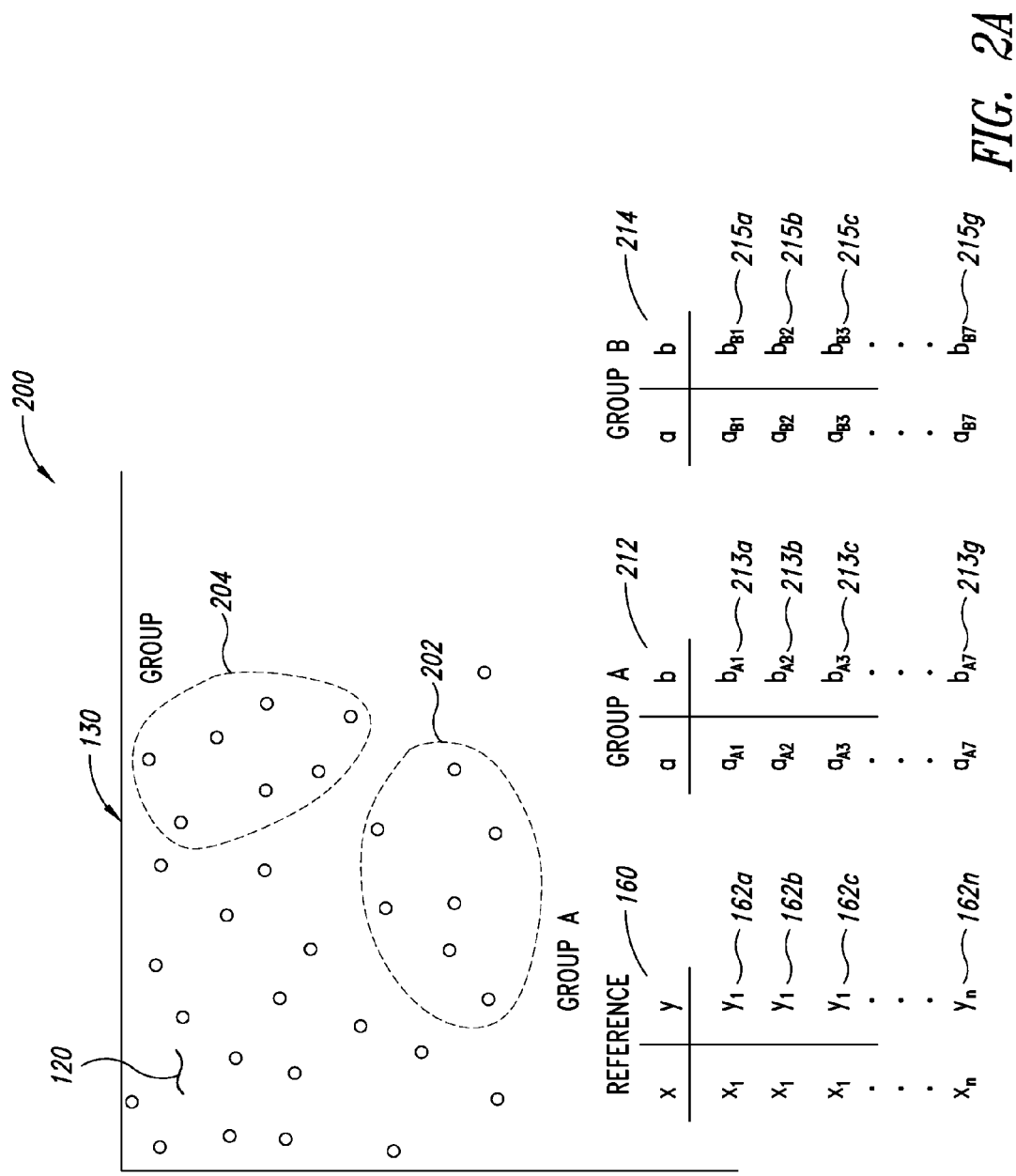
FIG. 2A is a schematic diagram of a portion of an example pattern of elements including two element groups, each containing a number of elements having a unique spatial relationship among the pattern of elements, and an ordered coordinate data list associated with each of the two client groups, according to one illustrated embodiment.

FIG. 2A shows two element groups 202 and 204, each including seven (7) elements having a spatial geometry that is unique among all groups of seven elements in the element pattern 130, according to an illustrated embodiment. FIGS. 2B and 2C show the two element groups 202 and 204 disposed about points of interest associated with an object 150 in the three-dimensional space 120, according to an illustrated embodiment.

Numerical data representative of the Cartesian coordinates 213 corresponding to element locations in element group 202 is included in coordinate data list 212. Numerical data representative of the Cartesian coordinates 215 corresponding to element locations in element group 204 is included in coordinate data list 214.

Recall, the spatial geometry between the elements included in each of element groups 202 and 204 is unique in that no group of seven elements elsewhere in the element pattern 130 will have a similar spatial geometry. Thus, the numerical data representative of the element locations of the elements included in element group 202 and the numerical data representative of the element locations of the elements included in element group 204 will be unique within the element pattern 130. Identifying reference elements having coordinate data indicative of a spatial arrangement in the reference element pattern 140 corresponding to the numerical data representative of the element locations of the elements included in element group 202 or the numerical data representative of the element locations of the elements included in element group 204 is therefore sufficient to find corresponding coordinate location data for every element included in the acquired image data of the element pattern 130.

The elements included in element groups 202 and 204 may be manually selected by the system user or automatically selected by the at least one processor 104. In at least some instances, the volume dimensioning system user can manually select one or more element groups using the input device 114, such as by providing a touch input on a touchscreen input device 114. In other instances, the at least one processor 104 can select the elements included in each of the groups of elements. As shown in FIGS. 2B and 2C, at times, the element groups may include a number of points of interest 220 that are either manually identified by the system user or autonomously identified by the at least one processor 104. Such points of interest 220 may include surface features present on the object 150, such as corners of a cubic object 150 as depicted in FIGS. 2B and 2C.

After a number of element groups are either manually or autonomously identified, the machine executable instruction set can cause the at least one processor 104 to identify those elements within each of the respective element groups 202, 204 and extract the data indicative of the Cartesian coordinate 213, 215 locations of each of the elements within each of the respective element groups 202, 204 from the acquired image data provided by the image acquisition device 102. The at least one processor 104 can generate or otherwise form a number of coordinate data lists 212, 214, each containing numerical data indicative of the Cartesian coordinate locations 213, 215 of the elements included in each of the respective element groups 202, 204. In at least some instances the at least one processor 104 can sort the numerical data indicative of the Cartesian coordinate locations of the elements included in each of the respective coordinate data lists 212, 214.

The reference data list 160 can be searched against each of the respective coordinate data lists 212, 214 by the at least one processor to identify reference elements having locations corresponding to the locations of the elements included in each group. In at least some instances, the numerical data indicative of the Cartesian coordinates 162 of the reference elements in the reference element pattern 140 may be sorted by the at least one processor prior to performing the search against each of the coordinate data lists 212, 214.

The search performed by the at least one processor 104 can be performed using a top-down or bottom-up search strategy where the numerical data corresponding to the Cartesian coordinates 213, 215 of the elements included in each of the coordinate data lists 212, 214 are compared to the numerical data indicative of the Cartesian coordinates 162 of the reference elements in the reference element pattern 140.

In some instances, the search performed by the at least one processor 104 can be further streamlined by taking advantage of the fact that the elements included in each of the groups 202, 204 are in close geometric proximity. Since the numerical data indicative of the Cartesian coordinates 162 of the reference elements in the reference element pattern 140 is sorted, numerical data for those reference elements in close geometric proximity is usually found clumped or otherwise grouped within a smaller portion of the overall reference data list 160. By focusing the search for numerical data indicative of Cartesian coordinates 162 of reference elements corresponding to numerical data indicative of Cartesian coordinate locations 213, 215 of acquired elements included in each of the coordinate data lists 212, 214 on only portion of the reference data list 160, the overall burden on computing resources may be further reduced. For example, the numerical data indicative of Cartesian coordinate locations 213 of acquired elements included in coordinate data lists 212 can be used to initially search the reference data list 160 using a top-down or bottom-up search. However, once the Cartesian coordinates 162 of the first corresponding reference element are identified in the reference data list 160, the search continues not from the top or bottom of the reference data list 160, but instead from the identified corresponding reference element in the reference data list 162. The search can be performed upwardly, downwardly, or alternating upward and downward in the reference data list 160 from the identified corresponding reference element. For each subsequently identified reference element corresponding to an acquired element included in the coordinate data list 212, the at least one processor 104 can begin the search using an upward, downward or alternating upward and downward search of the reference data list 160 about the respective identified corresponding reference element.

Figure 3A:
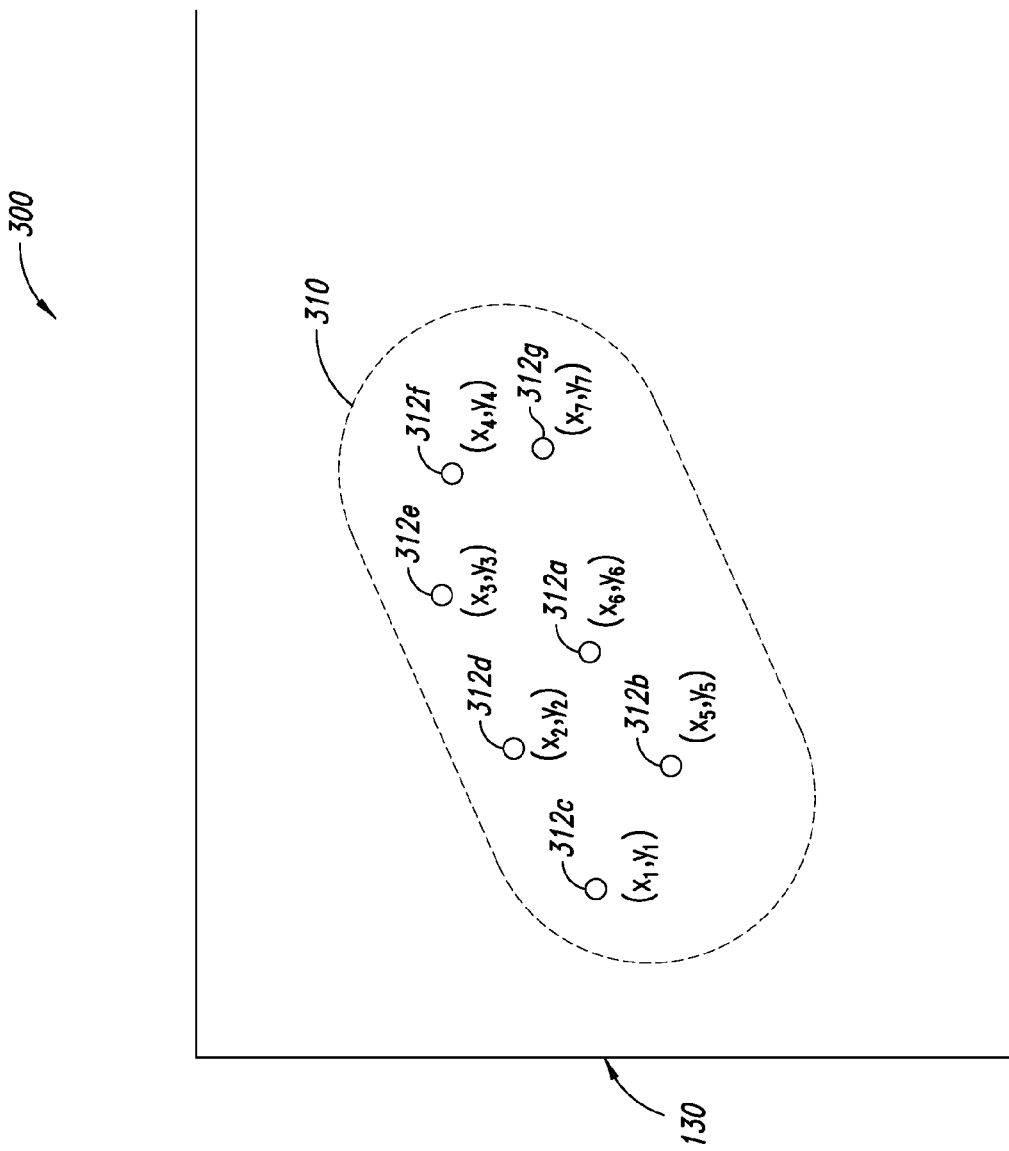
FIG. 3A is an enlarged view of a portion of an example pattern of elements projected into a three-dimensional space including Cartesian coordinate data associated with element locations in a group including a number of elements, according to one illustrated embodiment.
Figure 3B:
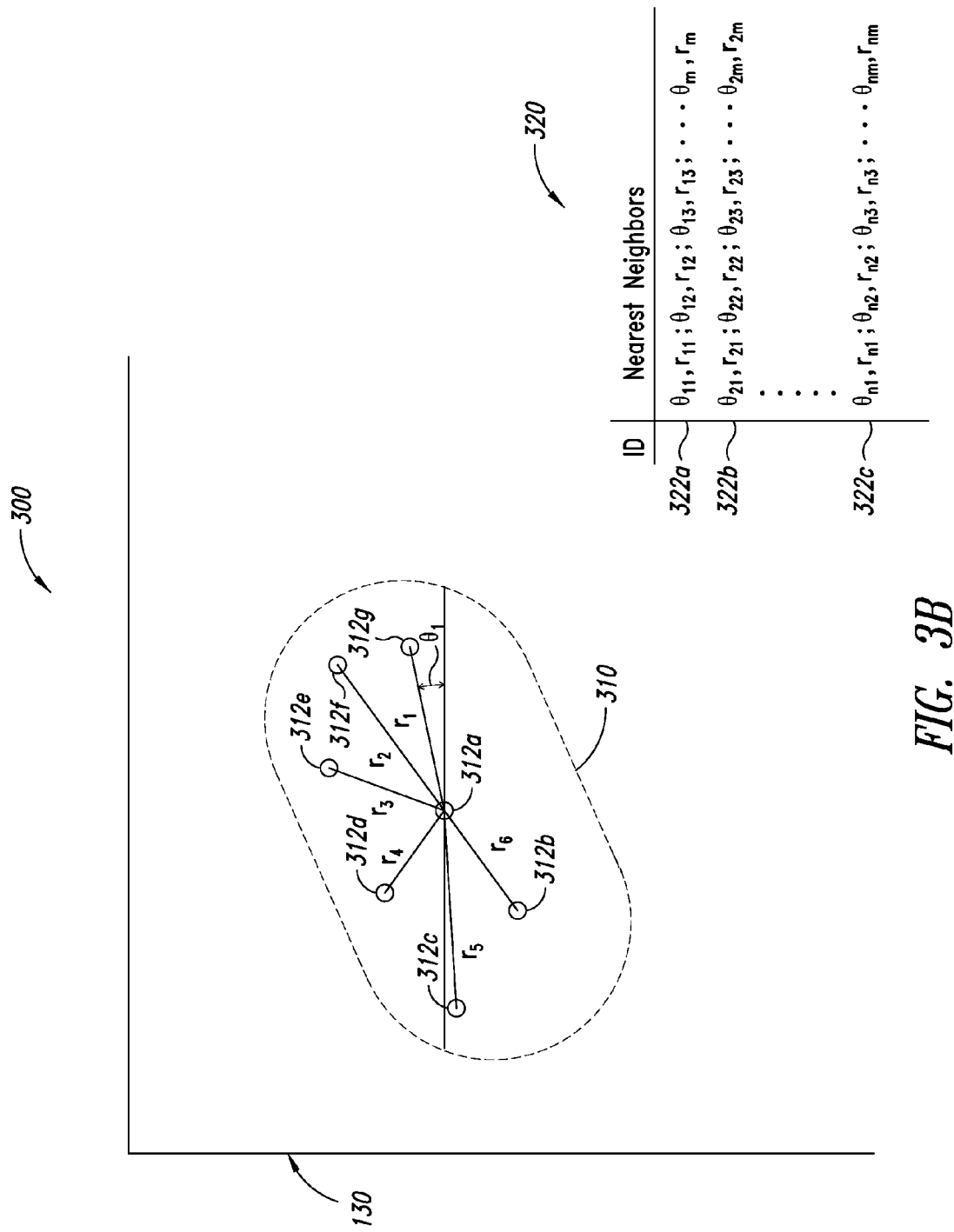
FIG. 3B is an image of a portion of the example pattern of elements shown in FIG. 3A projected into a three-dimensional space including locally-referenced coordinate data, according to one illustrated embodiment.

FIG. 3A shows an element group 310 that includes seven elements 312a-312g (collectively "acquired elements 312") in an acquired element pattern 130 where each of the elements 312 is identified using absolute coordinates in a system such as a Cartesian coordinate system, according to an illustrated embodiment. FIG. 3B shows the same element group 310 including the seven elements 312 in the acquired element pattern 130 where one of the elements (312a) is used to locally reference each of the other elements 312b-312g in the group using relative coordinates such as polar coordinates, according to an illustrated embodiment. Although a seven element group 310 is illustrated in FIGS. 3A and 3B, it should be understood by one of ordinary skill in the art that each element group 310 may contain a lesser or greater number of elements.

In some instances, the search performed by the at least one processor 104 can be further streamlined by converting the numerical data indicative of the Cartesian coordinates of the elements included in the element group 310 to a locally referenced coordinate system such as a polar coordinate system where a first element 312a in the group 310 is used to reference all of the other elements 312b-312g in group 310. In such instances, instead of including numerical data indicative of the Cartesian coordinates of the reference elements included in the reference element pattern 140 is converted to a reference data list 320 including locally-referenced numerical data 322a-322n (collectively "locally-referenced numerical data 322") indicative of the angle and distance to each of the "m" (where m=the number of elements included in each group−1) nearest reference element neighbors of a particular reference element. In some instances, the locally-referenced numerical data 322 may be included as a configuration parameter of the volume dimensioning system 100 at the time of manufacture, at the time of installation, at the time of start up, or periodically throughout the lifetime of the volume dimensioning system 100. In other instances, the numerical data included in a Cartesian coordinate based reference data list 160 may be numerically converted by the at least one processor 104 to locally-referenced numerical data 322 to provide the reference data list 320.

By converting the number of elements included in each group to a single string of locally-referenced coordinate data, the at least one processor 104 can search the reference data list 320 one time to find the reference element location corresponding to the location of the first element 312*a* used to reference all of the other elements in the group. However, since all of the other elements are locally-referenced in both the group 310 and in the reference data list 320, identifying the first element 312*a* also identifies every other element in the group 310. Thus, advantageously only a single search is performed to identify the seven reference elements corresponding to the seven elements included in the group 310.

Figure 4:
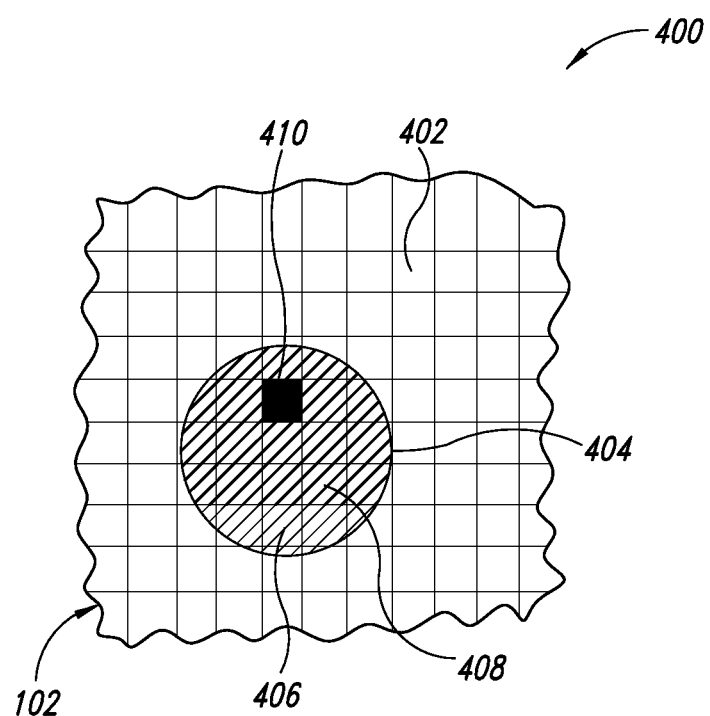
FIG. 4 is a schematic diagram of an illustrative element in an element pattern in which the element is formed using a number of pixels in the image acquisition device, each of the pixels having an associated grayscale value used to calculate the center of intensity of the element, according to one illustrated embodiment.

FIG. 4 shows a single element 404 detected by the image acquisition device 102 where the single element 404 provides a grayscale image covering a number of pixels 402 with varying degrees of intensity 406, 408, and 410, according to an illustrated embodiment. In at least some instances, determining a numerical value indicative of a "center of intensity" 410 of each element 404 included in the acquired element pattern 130 can improve the overall accuracy of dimensional and volumetric information determined by the volume dimensioning system 100 to a level well within established accuracy limits for trade and commerce. In at least some instances, prior to determining the coordinate location of each of the elements 404 in the acquired element pattern 130, the machine executable instructions can cause the at least one processor 106 to analyze each element 404 in the acquired element pattern 130 to determine a "center of intensity" for each of the elements. The determined "center of intensity" 410 can then be used by the at least one processor 104 to determine the numerical data indicative of the coordinate location for the respective element 404 with an enhanced level of accuracy. The numerical data indicative of the Cartesian coordinates 172 of the "center of intensity" for each element 404 in the acquired element pattern 130 may then be used by the at least one processor 104 to generate the coordinate data list 170.

In at least some implementations, the center of intensity may be numerically determined by the at least one processor 104 using any color, grayscale, or numerical averaging algorithm. One such numerical averaging algorithm is:

$$X_C = \frac{\Sigma_i w_i X_i}{\Sigma_i w_i}$$

$$Y_C = \frac{\Sigma_i w_i Y_i}{\Sigma_i w_i}$$

Figure 5:
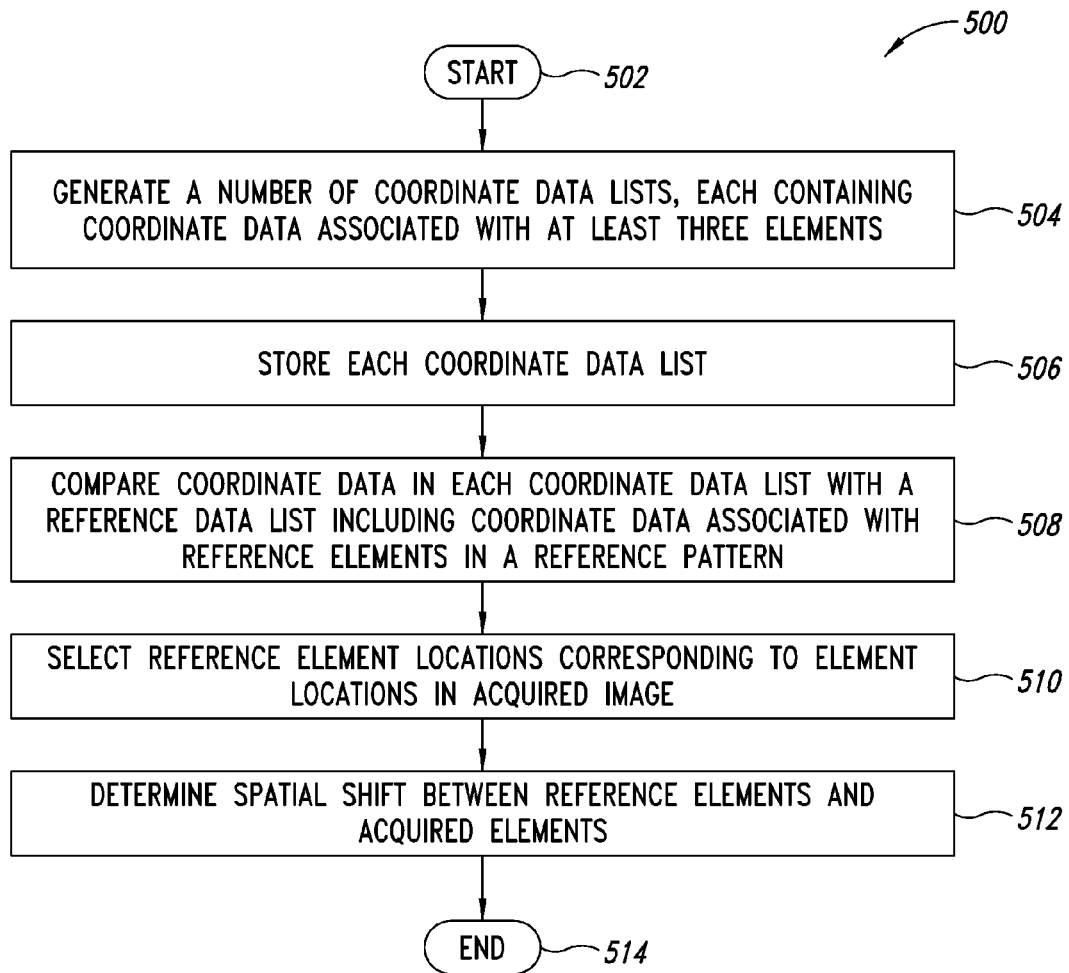
FIG. 5 is a high-level flow diagram of an example method of determining locations of each element in a pattern of elements included in an acquired image with locations of corresponding reference elements in the pattern of elements included in a reference image by numerically comparing a list of acquired element coordinate data with a list of reference element coordinate data, according to one illustrated embodiment.

Where:
$X_c$=Center of intensity in X direction of element
$Y_c$=Center of intensity in Y direction of element
$X_i$=X location of pixel forming element
$Y_i$=Y location of pixel forming element
$w_i$=Numerical grayscale weight of pixel FIG. 5 shows a high level method 500 of determining a spatial shift between an element pattern 130 and a reference element pattern 140 to enable the determination of a distance between the projection device 108 and each of the elements forming the acquired element pattern 130, according to an illustrated embodiment. The method 500 extracts numerical values corresponding to the Cartesian coordinate 172 locations for each of the elements in the element pattern 130 from an acquired image of a three-dimensional space 120 containing at least one object 150 to generate a coordinate data list 170. In some implementations, the numerical values in the coordinate data list 170 may optionally be sorted by the at least one processor 104 to provide an ordered coordinate data list 170. The numerical data representative of the element locations in each of the coordinate data lists 170 is compared against numerical data representative of the reference element location in a reference data list 160. The spatial shift between the elements in the acquired element pattern 130 and the reference element pattern 140 may be used to determine a distance from the projection device 108 generating the element pattern 130 to each of the respective elements. The determined distance to each element in the element pattern can be used to determine the volume dimension of objects 150 placed in the three-dimensional space 120. The comparison of numerical data representative of the element locations in each of the coordinate data lists 170 against numerical data representative of the reference element location in a reference data list 160 reduces the computing overhead requirements when compared to graphical search techniques, advantageously permitting the use of the volume dimensioning system 100 on portable electronic devices having limited computing resources. The method commences at 502.

At 504, responsive to receiving image data from the image acquisition device 102, the at least one processor 104 can extract data representative of each element in at least a portion of the element pattern 130 from the image data. The at least one processor 104 can further determine numerical values corresponding to the Cartesian coordinates of each element in the element pattern 130 from the data representative of each element extracted from the acquired image data. The at least one processor 104 can further generate a number of coordinate data lists 170. Each of the coordinate data lists 170 can include numerical data indicative of the Cartesian coordinate locations corresponding to at least three elements in the element pattern 130 as determined by the at least one processor 104 using the acquired image data obtained from the image acquisition device 102.

At 506, the at least one processor 104 can store each of the generated coordinate data lists 170 in a non-transitory storage medium. The non-transitory storage medium can include a non-transitory storage medium located in whole or in part within the at least one processor 104 or a dedicated non-transitory storage medium such as the non-transitory storage medium 106.

At 508, the at least one processor 104 can compare the numerical data indicative of the Cartesian coordinates 172 of each of the elements included in each of the coordinate data lists 170 with stored numerical data indicative of the Cartesian coordinates 162 of each of the reference elements included in a reference element pattern 140. The comparison between the numerical data in each of the coordinate data lists 170 and the numerical data in the reference data list 160 may be performed using a top-down, bottom-up, or similar search technique.

At 510, the at least one processor 104 can identify for each element included in each coordinate data list 170 a corresponding reference element included in the reference data list 160. In at least some instances, such identification may be based at least in part on the numerical data indicative of the Cartesian coordinate locations 172 of each of the elements and the numerical data indicative of the Cartesian coordinate locations 162 of each of the reference elements.

At 512, using the element correspondence determined at 510, the at least one processor can determine the spatial shift between each of the elements in the acquired element pattern 130 and the reference element pattern 140. The determined spatial shift between the acquired and corresponding reference elements may be used to subsequently determine the distance between the projection device 108 and each of the elements in the element pattern 130 as a preparatory step in volume dimensioning objects 150 placed in the three-dimensional space 120 within the field-of-view of the image acquisition device 102. The method concludes at 514.

Figure 6:
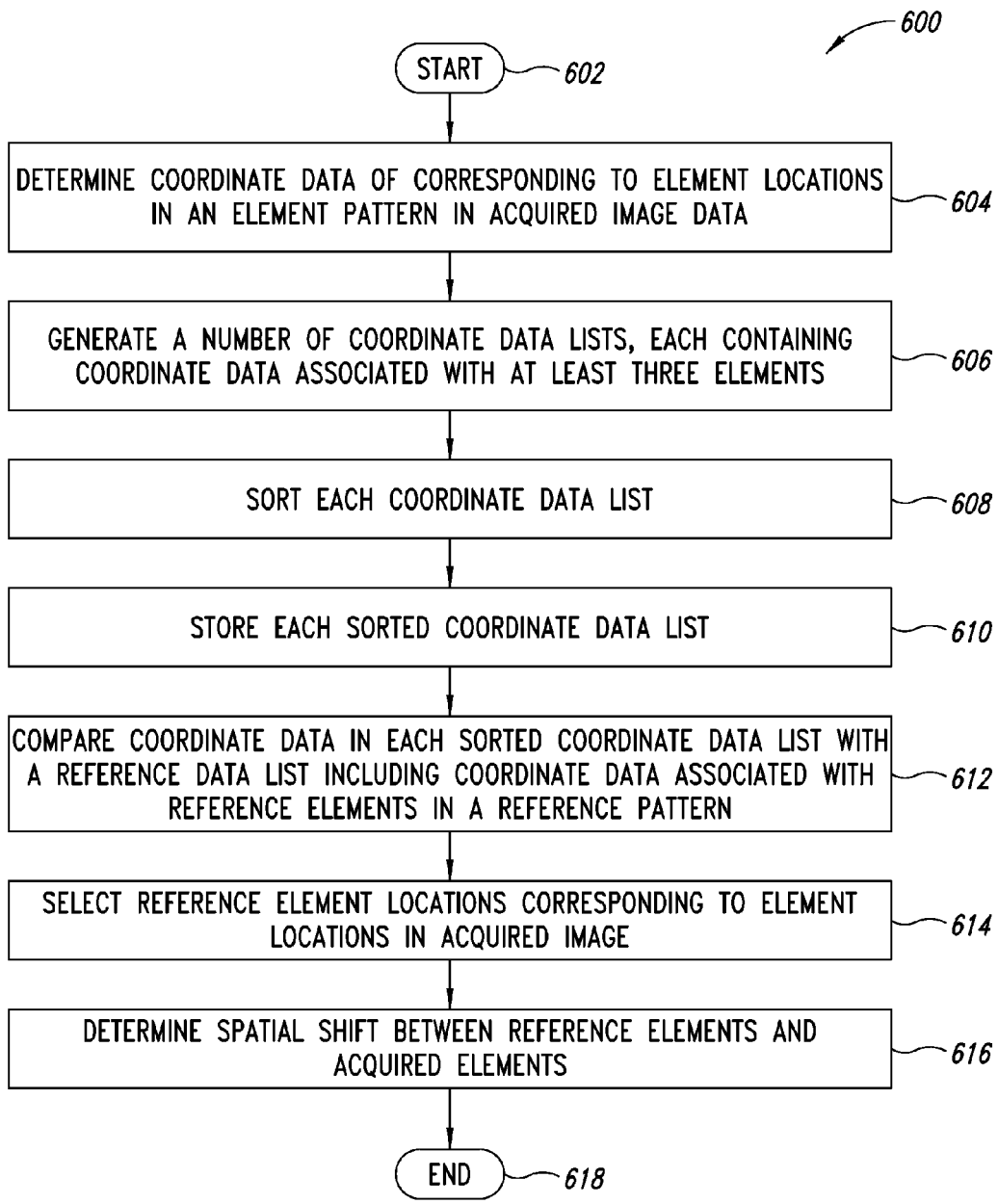
FIG. 6 is a high-level flow diagram of an example method of determining locations of a number of groups of elements, each group including a number of elements in a pattern of elements included in an acquired image with locations of corresponding reference elements in the pattern of elements included in a reference image by numerically comparing a list of acquired element coordinate data associated with the elements included in each group with a list of reference element coordinate data, according to one illustrated embodiment.

FIG. 6 shows a high level method 600 of determining a spatial shift between an element pattern 130 and a reference element pattern 140 to enable the determination of a distance between the projection device 108 and each of the elements forming the acquired element pattern 130 using a number of sorted coordinate data lists 170, according to an illustrated embodiment. The method 600 extracts numerical values corresponding to the Cartesian coordinate 172 locations for each of the elements in the element pattern 130 from an acquired image of a three-dimensional space 120 containing at least one object 150 to generate a number of coordinate data lists 170. The numerical values in each of the number of coordinate data lists 170 are sorted by the at least one processor 104 to provide a number of ordered coordinate data lists 170. Each of the number of ordered coordinate data lists 170 is compared against a reference data list 160 containing numerical values for the Cartesian coordinate locations 162 for each of the elements in a reference element pattern 140. In at least some instances, the numerical data contained in the reference data list 160 may also be sorted. The sorted coordinate data lists 170 and sorted reference data list 160 advantageously further reduce the search requirement since element groups often appear in close proximity within the reference data list 160. The spatial shift between the elements in the acquired element pattern 130 and the reference element pattern 140 may be used to determine a distance from the projection device 108 generating the element pattern 130 to each of the respective elements. The determined distance to each element in the element pattern can be used to determine the volume dimension of objects 150 placed in the three-dimensional space 120. The comparison of numerical data in the coordinate data list 170 with numerical data in the reference data list 160 reduces the computing overhead requirements when compared to graphical search techniques, advantageously permitting the use of the volume dimensioning system 100 on portable electronic devices having limited computing resources. The method commences at 602.

At 604, responsive to receiving image data from the image acquisition device 102, the at least one processor 104 can extract data representative of each element in at least a portion of the element pattern 130 from the image data. The at least one processor 104 can further determine numerical values corresponding to the Cartesian coordinates of each element in the element pattern 130 from the data representative of each element extracted from the acquired image data.

At 606, the at least one processor 104 generates a number of coordinate data lists 170. Each of the coordinate data lists 170 can include numerical data indicative of the Cartesian coordinate locations corresponding to an element group including at least three elements in the element pattern 130. The elements included in each element group may be manually determined by the system user or autonomously determined by the at least one processor 104. In at least some instances, some or all of the element groups may correspond to manually or autonomously identified points of interest within the acquired image data.

At 608, the at least one processor 104 can sort the numerical data included in each of the number of coordinate data lists 170 to provide a number of ordered coordinate data lists 170.

At 610, the at least one processor 104 can store each of the ordered coordinate data lists 170 in a non-transitory storage medium. The non-transitory storage medium can include a non-transitory storage medium located in whole or in part within the at least one processor 104 or a dedicated non-transitory storage medium such as the non-transitory storage medium 106.

At 612, the at least one processor 104 can compare the numerical data indicative of the Cartesian coordinates 172 of each of the elements included in each of the ordered coordinate data lists 170 with stored numerical data indicative of the Cartesian coordinates 162 of each of the reference elements included in a reference element pattern 140. The comparison between the numerical data corresponding to a first element in each of the coordinate data lists 170 and the numerical data in the reference data list 160 may be performed using a top-down, bottom-up, or similar search technique. In searches for subsequent elements included in each of the coordinate data lists 170, the at least one processor 104 can begin searching upward, downward, or alternating upward and downward from the reference element corresponding to the immediately previous element in the coordinate data list. For example, the at least one processor 104 may start at the bottom or the top of the reference data list 160 to perform the initial search of the reference data list 160 to identify a reference element corresponding to the first element in a coordinate data list 170. After the reference element corresponding to the first element in the coordinate data list 170 is identified, the at least one processor will begin the search of the reference data list 160 to identify a reference element corresponding to a second element in the coordinate data list 170 at the reference element corresponding to the first element in the coordinate data list 170. The search for the reference element corresponding to the second element in the coordinate data list 170 can be performed upwardly in the reference data list 160, downwardly in the reference data list 160, or alternating between upward and downward in the reference data list 160.

At 614, the at least one processor 104 can identify for each element included in each of the number of coordinate data lists 170 a corresponding reference element included in the reference data list 160. In at least some instances, such identification may be based at least in part on the numerical data indicative of the Cartesian coordinate locations 172 of each of the elements and the numerical data indicative of the Cartesian coordinate locations 162 of each of the reference elements.

At 616, using the element correspondence determined at 614, the at least one processor can determine the spatial shift between each of the elements in the acquired element pattern 130 and the reference element pattern 140. The determined spatial shift between the acquired and corresponding reference elements may be used to subsequently determine the distance between the projection device 108 and each of the elements in the element pattern 130 as a preparatory step in volume dimensioning objects 150 placed in the three-dimensional space 120 within the field-of-view of the image acquisition device 102. The method concludes at 618.

Figure 7:
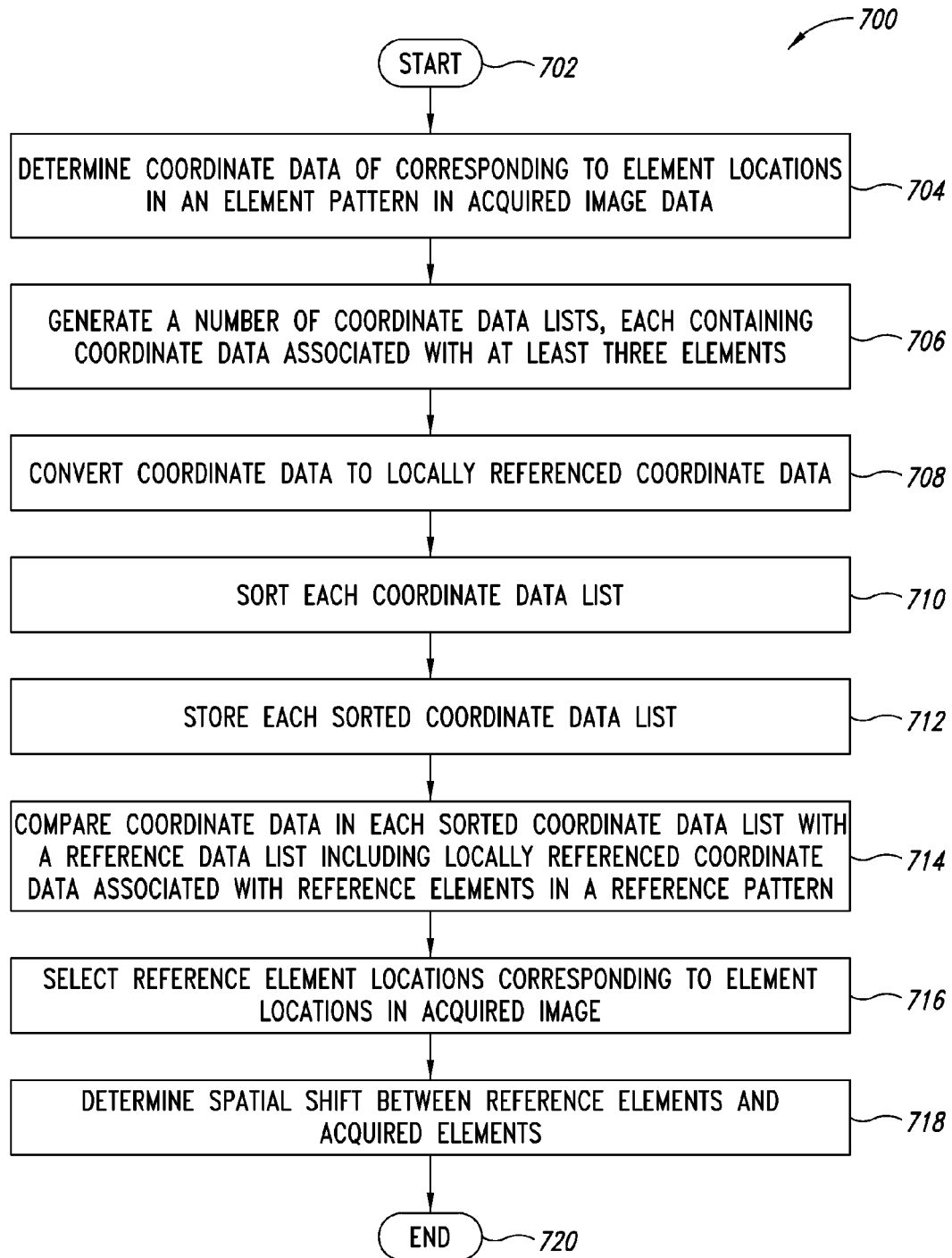
FIG. 7 is a high-level flow diagram of an example method of determining locations of a number of groups of elements, each group including a number of elements in a pattern of elements included in an acquired image with locations of corresponding reference elements in the pattern of elements included in a reference image by numerically comparing a list of locally-referenced acquired element coordinate data associated with the elements included in each group with a list of locally-referenced reference element coordinate data, according to one illustrated embodiment.

FIG. 7 shows a high level method 700 of determining a spatial shift between an element pattern 130 and a reference element pattern 140 to enable the determination of a distance between the projection device 108 and each of the elements forming the acquired element pattern 130 using a number of sorted, locally-referenced, coordinate data lists 170, according to an illustrated embodiment. The method 700 extracts numerical values corresponding to the Cartesian coordinate 172 locations for each of the elements in the element pattern 130 from an acquired image of a three-dimensional space 120 containing at least one object 150. Element groups including at least three elements are manually or autonomously identified and numerical data indicative of the Cartesian coordinates for each of the at least three elements included in each of the number of element groups are formed into a coordinate data list for the respective element group.

The numerical data indicative of the Cartesian coordinates for the at least three elements in each element group are then converted by the at least one processor 104 to numerical data indicative of a locally-referenced coordinate system where a first element in each element group is locally referenced to every other element included in the element group. Each of the number of coordinate data lists 170 is thus transformed into locally-referenced coordinate data list.

The numerical values in each of the number of locally-referenced coordinate data lists may be optionally sorted by the at least one processor 104 to provide a number of ordered, locally-referenced, coordinate data lists. Each of the number of locally referenced coordinate data lists is compared against a locally referenced reference data list 320. In at least some instances, the numerical data contained in the locally-referenced reference data list 320 may also be sorted. The locally-referenced coordinate data lists and locally-referenced reference data list 320 advantageously further reduce the search requirement since only a single search is needed to identify reference elements corresponding to all of the elements in an element group. The spatial shift between the elements in the acquired element pattern 130 and the reference element pattern 140 may be used to determine a distance from the projection device 108 generating the element pattern 130 to each of the respective elements. The determined distance to each element in the element pattern can be used to determine the volume dimension of objects 150 placed in the three-dimensional space 120. The comparison of numerical data in the locally-referenced coordinate data list with numerical data in the locally-referenced reference data list 320 further reduces the computing overhead requirements when compared to graphical search techniques, advantageously permitting the use of the volume dimensioning system 100 on portable electronic devices having limited computing resources. The method commences at 702.

At 704, responsive to receiving image data from the image acquisition device 102, the at least one processor 104 can extract data representative of each element in at least a portion of the element pattern 130 from the image data. The at least one processor 104 can further determine numerical values corresponding to the Cartesian coordinates of each element in the element pattern 130 from the data representative of each element extracted from the acquired image data.

At 706, the at least one processor 104 generates a number of coordinate data lists 170. Each of the coordinate data lists 170 can include numerical data indicative of the Cartesian coordinate locations corresponding to an element group including at least three elements in the element pattern 130. The elements included in each element group may be manually determined by the system user or autonomously determined by the at least one processor 104. In at least some instances, some or all of the element groups may correspond to manually or autonomously identified points of interest within the acquired image data.

At 708, the at least one processor 104 can convert the numerical data indicative of Cartesian coordinate locations for each of the elements included in the coordinate data list 170 associated with each element group to numerical data indicative of a locally-referenced coordinates for each of the elements included in the coordinate data list 170 associated with each element group. In at least one instance, a first element in each element group may be identified by the at least one processor 104 and each subsequent element included in the element group may be locally referenced to the identified first element using Polar coordinates (e.g., an angle and distance between the elements).

At 710, the at least one processor 104 may optionally sort the numerical data included in each of the number of locally-referenced coordinate data lists to provide a number of ordered, locally-referenced, coordinate data lists.

At 712, the at least one processor 104 can store each of the locally-referenced coordinate data lists in a non-transitory storage medium. The non-transitory storage medium can include a non-transitory storage medium located in whole or in part within the at least one processor 104 or a dedicated non-transitory storage medium such as the non-transitory storage medium 106.

At 714, the at least one processor 104 can compare the numerical data indicative of the locally-referenced coordinates of each of the elements included in each of the locally-referenced coordinate data lists with stored numerical data indicative of the locally-referenced coordinates 322 of each of the reference elements included in a locally-referenced reference data list 320. The comparison between the numerical data indicative of the locally-referenced coordinates of each of the elements included in each of the locally-referenced coordinate data lists and the locally-referenced reference data list 320 may be performed using a top-down, bottom-up, or similar search technique At 716, the at least one processor 104 can identify for each element included in each of the number of locally-referenced coordinate data lists a corresponding reference element included in the locally-referenced reference data list 320. In at least some instances, such identification may be based at least in part on the numerical data indicative of the locally-referenced coordinates of each of the elements included in the element group and the numerical data indicative of the locally-referenced coordinate locations 322 of each of the reference elements.

At 718, using the element correspondence determined at 716, the at least one processor can determine the spatial shift between each of the elements in the acquired element pattern 130 and the reference element pattern 140. The determined spatial shift between the acquired and corresponding reference elements may be used to subsequently determine the distance between the projection device 108 and each of the elements in the element pattern 130 as a preparatory step in volume dimensioning objects 150 placed in the three-dimensional space 120 within the field-of-view of the image acquisition device 102. The method concludes at 720.

Figure 8:
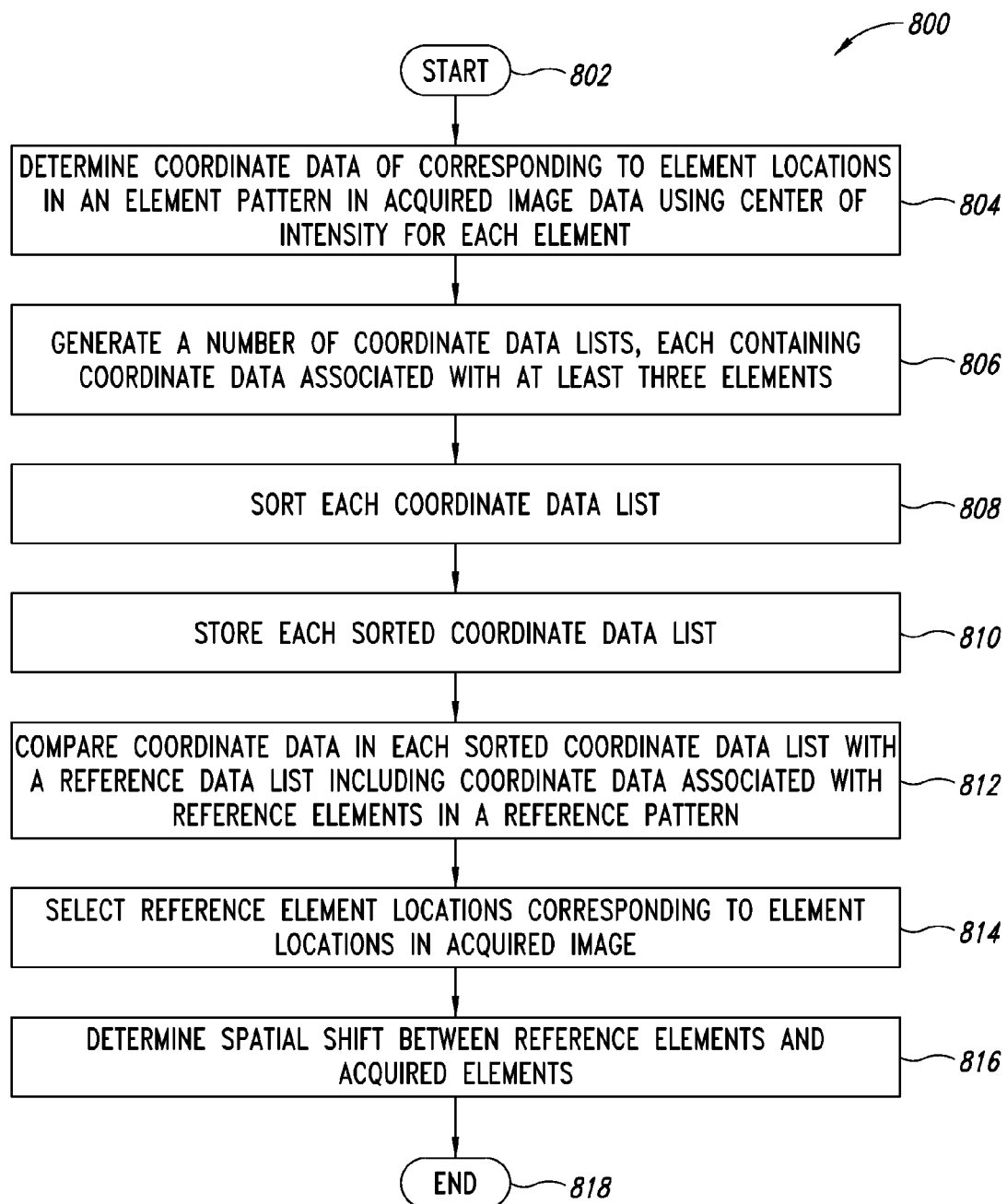
FIG. 8 is a high-level flow diagram of an example method of determining locations of each element in a pattern of elements included in an acquired image with locations of corresponding reference elements in the pattern of elements included in a reference image by numerically comparing a list of acquired element center of intensity coordinate data with a list of reference element coordinate data, according to one illustrated embodiment, according to one illustrated embodiment.

FIG. 8 shows a high level method 800 of determining with enhanced accuracy a spatial shift between an element pattern 130 and a reference element pattern 140 to enable the determination of a distance between the projection device 108 and each of the elements forming the acquired element pattern 130, according to an illustrated embodiment. The at least one processor 104 first determines a "center of intensity" 410 for each element included in the acquired element pattern 130. The determined center of intensity 410 is then used by the at least one processor 104 to extract numerical values of the Cartesian coordinate 172 locations for each of the elements in the element pattern 130 from an acquired image of a three-dimensional space 120 containing at least one object 150 to generate a coordinate data list 170. In some implementations, the numerical values in the coordinate data list 170 can be sorted by the at least one processor 104 to provide an ordered coordinate data list 170. The coordinate data list is compared against a reference data list 160 containing numerical values for the Cartesian coordinate locations 162 for each of the elements in a reference element pattern 140. The spatial shift between the elements in the acquired element pattern 130 and the reference element pattern 140 may be used to determine a distance from the projection device 108 generating the element pattern 130 to each of the respective elements. The determined distance to each element in the element pattern can be used to determine the volume dimension of objects 150 placed in the three-dimensional space 120. The comparison of numerical data in the coordinate data list 170 with numerical data in the reference data list 160 reduces the computing overhead requirements when compared to graphical search techniques, advantageously permitting the use of the volume dimensioning system 100 on portable electronic devices having limited computing resources. The method commences at 802.

At 804, responsive to receiving image data from the image acquisition device 102, the at least one processor 104 extract data representative of each element in at least a portion of the element pattern 130 from the acquired image data provided by an image acquisition device 102. The at least one processor 104 then determines a "center of intensity" 410 for each of the extracted elements. The at least one processor 104 can then determine numerical values corresponding to the Cartesian coordinates of the determined "center of intensity" 410 for each element in the element pattern 130 from the data representative of each element extracted from the acquired image data.

At 806, the at least one processor 104 generates a number of coordinate data lists 170. Each of the coordinate data lists 170 can include numerical data indicative of the Cartesian coordinate locations corresponding to at least three elements in the element pattern 130 as determined by the at least one processor 104 using the acquired image data obtained from the image acquisition device 102.

At 808, the at least one processor 104 can optionally sort the numerical data included in each of the number of coordinate data lists 170 to provide a number of ordered coordinate data lists 170.

At 810, the at least one processor 104 can store each of the ordered coordinate data lists 170 in a non-transitory storage medium. The non-transitory storage medium can include a non-transitory storage medium located in whole or in part within the at least one processor 104 or a dedicated non-transitory storage medium such as the non-transitory storage medium 106.

At 812, the at least one processor 104 can compare the numerical data indicative of the Cartesian coordinates 172 of each of the elements included in each of the ordered coordinate data lists 170 with stored numerical data indicative of the Cartesian coordinates 162 of each of the reference elements included in a reference element pattern 140. The comparison between the numerical data in each of the ordered coordinate data lists 170 and the numerical data in the reference data list 160 may be performed using a top-down, bottom-up, or similar search technique.

At 814, the at least one processor 104 can identify for each element included in each ordered coordinate data list 170 a corresponding reference element included in the reference data list 160. In at least some instances, such identification may be based at least in part on the numerical data indicative of the Cartesian coordinate locations 172 of each of the elements and the numerical data indicative of the Cartesian coordinate locations 162 of each of the reference elements.

At 816, using the element correspondence determined at 510, the at least one processor can determine the spatial shift between each of the elements in the acquired element pattern 130 and the reference element pattern 140. The determined spatial shift between the acquired and corresponding reference elements may be used to subsequently determine the distance between the projection device 108 and each of the elements in the element pattern 130 as a preparatory step in volume dimensioning objects 150 placed in the three-dimensional space 120 within the field-of-view of the image acquisition device 102. The method concludes at 818.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) or programmable gate arrays. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Various methods and/or algorithms have been described. Some or all of those methods and/or algorithms may omit some of the described acts or steps, include additional acts or steps, combine acts or steps, and/or may perform some acts or steps in a different order than described. Some of the method or algorithms may be implemented in software routines. Some of the software routines may be called from other software routines. Software routines may execute sequentially or concurrently, and may employ a multi-threaded approach.

In addition, those skilled in the art will appreciate that the mechanisms taught herein are capable of being distributed as a program product in a variety of forms, and that an illustrative embodiment applies equally regardless of the particular type of signal bearing non-transitory media used to actually carry out the distribution. Examples of non-transitory signal bearing media include, but are not limited to, the following: recordable type media such as portable disks and memory, hard disk drives, CD/DVD ROMs, digital tape, computer memory, and other non-transitory computer-readable storage media.

While discussed in terms of projection of dots, many of the techniques described herein could be employed in dimensioning systems that capture image data from objects which bear element patterns, for instance printed or otherwise inscribed on or in at least one surface of the object.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A portable structured light dimensioning system to determine a volume dimension of an object, comprising:
   an image acquisition device to acquire image data representative of an element pattern projected into a three-dimensional space that includes an object;
   a processor communicably coupled to the image acquisition device; and
   a non-transitory storage medium communicably coupled to the processor and having stored therein machine executable instructions that when executed by the processor cause the processor to:
      determine coordinate data associated with element locations in a portion of the element pattern present in the acquired image data;
      generate a number of coordinate data lists, each including coordinate data associated with at least three element locations in the acquired image data;
      for each coordinate data list:
         compare the coordinate data associated with each of the at least three element locations in the acquired image data with a reference data list including reference coordinate data associated with reference element locations in a reference element pattern; and
         select for each of the at least three element locations, a corresponding reference element location in the reference element pattern;
         determine a spatial shift between the coordinate data associated with each of the at least three element locations in the acquired image data and the coordinate data associated with the respective corresponding reference element location in the reference element pattern; and
         sort the coordinate data using a defined sort pattern to provide a respective ordered coordinate data list;
      generate an ordered coordinate data list about each of a number of points of interest in the acquired image data to provide the number of ordered coordinate data lists, each ordered coordinate data list including coordinate data associated with each of at least three element locations about each respective point of interest; and
      accept a number of user inputs, each of the user inputs corresponding to one of the number of points of interest in the acquired image data.

2. The system of claim 1, wherein the machine executable instructions, when executed by the processor, cause the processor to:
   for each coordinate data list, compare the coordinate data associated with each of the at least three element locations in the acquired image data with a reference data list by performing for the coordinate data associated with each of the at least three element locations, at least one of: a top-to-bottom search, or, a bottom-to-top search of the reference data list to compare the coordinate data associated with the respective element location with coordinate data associated with each reference element location in the reference data list.

3. The system of claim 1, wherein the machine executable instructions, when executed by the processor, cause the processor to:
   for each ordered coordinate data list, convert the coordinate data associated with the at least three element locations in the acquired image data to a second, locally-referenced coordinate system that relates the coordinate data associated a first of the at least three elements included the respective ordered coordinate data list to the coordinate data associated with each of the other of the at least three elements included in the respective ordered coordinate data list to provide a respective ordered, locally referenced, coordinate data list.

4. The system of claim 1, wherein the machine executable instructions, when executed by the processor, cause the processor to:
   determine a center of intensity of element locations in a portion of the element pattern present in the acquired image data; and
   determine coordinate data corresponding to the determined center of intensity of the element locations in a portion of the element pattern present in the acquired image data.

5. The system of claim 4, wherein the machine executable instructions, when executed by the processor, cause the processor to:
   determine a center of intensity of element locations in a portion of the element pattern present in the acquired image data using grayscale values associated with each of the respective element locations.

6. The system of claim 1, wherein the machine executable instructions, when executed by the processor, cause the processor to:
   determine a respective distance between the image acquisition device and each of the elements in a portion of the pattern of elements incident upon the object positioned in the three-dimensional space; and
   determine a respective volume dimension associated with the object using the determined respective distances between the image acquisition device and each of the elements in a portion of the pattern of elements incident upon the object positioned in the three-dimensional space.

7. A portable structured light dimensioning system to determine a volume dimension of an object, comprising:
   an image acquisition device to acquire image data representative of an element pattern projected into a three-dimensional space that includes an object;
   a processor communicably coupled to the image acquisition device; and
   a non-transitory storage medium communicably coupled to the processor and having stored therein machine executable instructions that when executed by the processor cause the processor to:
      determine coordinate data associated with element locations in a portion of the element pattern present in the acquired image data;
      generate a number of coordinate data lists, each including coordinate data associated with at least three element locations in the acquired image data;
      for each coordinate data list:
         compare the coordinate data associated with each of the at least three element locations in the acquired image data with a reference data list including reference coordinate data associated with reference element locations in a reference element pattern; and select for each of the at least three element locations, a corresponding reference element location in the reference element pattern;

determine a spatial shift between the coordinate data associated with each of the at least three element locations in the acquired image data and the coordinate data associated with the respective corresponding reference element location in the reference element pattern; and sort the coordinate data using a defined sort pattern to provide a respective ordered coordinate data list;

generate an ordered coordinate data list about each of a number of points of interest in the acquired image data to provide the number of ordered coordinate data lists, each ordered coordinate data list including coordinate data associated with each of at least three element locations about each respective point of interest; and autonomously determine each of the number of points of interest in the acquired image data.

8. The system of claim 7, wherein the machine executable instructions, when executed by the processor, cause the processor to:

for each ordered coordinate data list perform at least one of a top-to-bottom search or a bottom-to-top search of the reference data list to compare the coordinate data associated with a first element location in the ordered coordinate data list with coordinate data associated with each reference element location in the reference data list; and for coordinate data in the ordered coordinate data list associated with each remaining element location, perform at least one of an upward search, a downward search, or an alternating upward/downward search about coordinate data associated with a reference element in the reference data list corresponding to coordinate data associated with an immediately preceding element location.

9. The system of claim 7, wherein the machine executable instructions, when executed by the processor, cause the processor to:

for each ordered coordinate data list, convert the coordinate data associated with the at least three element locations in the acquired image data to a second, locally-referenced coordinate system that relates the coordinate data associated a first of the at least three elements included the respective ordered coordinate data list to the coordinate data associated with each of the other of the at least three elements included in the respective ordered coordinate data list to provide a respective ordered, locally referenced, coordinate data list; and for each ordered, locally referenced, coordinate data list perform at least one of a top-to-bottom search or a bottom-to-top search of a locally-referenced, reference data list in which the coordinate data associated with each reference element is related to coordinate data associated with a number of neighboring reference elements in the reference pattern, to compare the locally-referenced coordinate data associated with the first of the at least three elements in the ordered, locally-referenced, coordinate data list with coordinate data associated with each reference element location in the locally-referenced, reference data list.

10. The system of claim 7, wherein the machine executable instructions, when executed by the processor, cause the processor to:

determine a center of intensity of element locations in a portion of the element pattern present in the acquired image data; and determine coordinate data corresponding to the determined center of intensity of the element locations in a portion of the element pattern present in the acquired image data.

11. The system of claim 10, wherein the machine executable instructions, when executed by the processor, cause the processor to:

determine a center of intensity of element locations in a portion of the element pattern present in the acquired image data using grayscale values associated with each of the respective element locations.

12. The system of claim 7, wherein the machine executable instructions, when executed by the processor, cause the processor to:

determine a respective distance between the image acquisition device and each of the elements in a portion of the pattern of elements incident upon the object positioned in the three-dimensional space; and determine a respective volume dimension associated with the object using the determined respective distances between the image acquisition device and each of the elements in a portion of the pattern of elements incident upon the object positioned in the three-dimensional space.

13. A structured light dimensioning method to determine a volume dimension of an object, comprising:

determining with a processor coordinate data corresponding to element locations in a portion of an element pattern present in acquired image data provided by an image capture device communicably coupled to the processor;

generating with the processor a number of coordinate data lists, each coordinate data list including coordinate data associated with at least three element locations in the acquired image data;

storing each of the number of coordinate data lists in a non-transitory storage media communicably coupled to the processor;

for each coordinate data list:

comparing with the processor the coordinate data associated with each of the at least three element locations in the acquired image data with a reference data list stored in a non-transitory storage media communicably coupled to the processor, the reference data list including reference coordinate data associated with reference element locations in a reference element pattern;

selecting with the processor, for each of the at least three element locations, a corresponding reference element location in the reference element pattern;

determining with the processor a spatial shift between the coordinate data associated with each of the at least three element locations in the acquired image data and the coordinate data associated with the respective corresponding reference element location in the reference element pattern; and sorting with the processor the coordinate data using a defined sort pattern to provide a respective ordered coordinate data list;

generating with the processor an ordered coordinate data list proximate each of a number of points of interest in the acquired image data to provide the number of ordered coordinate data lists, each ordered coordinate data list including coordinate data associated with each of at least three element locations about each respective point of interest; and accepting with the processor a number of user inputs provided via a user interface communicably coupled to the processor, each of the user inputs corresponding to one of the number of points of interest in the acquired image data.

14. The method of claim 13, wherein comparing with the processor the coordinate data associated with each of the at least three element locations in the acquired image data with a reference data list comprises:

comparing with the processor the coordinate data associated with each of the at least three element locations in the acquired image data with a reference data list by performing for the coordinate data associated with each of the at least three element locations, at least one of a top-to-bottom search or a bottom-to-top search of the reference data list to compare the coordinate data associated with the respective element location with coordinate data associated with each reference element location in the reference data list.

15. The method of claim 13, comprising:

for each ordered coordinate data list, performing with the processor at least one of a top-to-bottom search or a bottom-to-top search of the reference data list to compare the coordinate data associated with a first element location in the ordered coordinate data list with coordinate data associated with each reference element location in the reference data list; and for coordinate data in the ordered coordinate data list associated with each remaining element location, performing with the processor at least one of an upward search, a downward search, or an alternating upward/downward search about coordinate data associated with a reference element in the reference data list corresponding to coordinate data associated with an immediately preceding element location.

16. The method of claim 13, comprising, for each ordered coordinate data list, converting with the processor, the coordinate data associated with the at least three element locations in the acquired image data to a second, locally-referenced coordinate system that relates the coordinate data associated a first of the at least three elements included the respective ordered coordinate data list to the coordinate data associated with each of the other of the at least three elements included in the respective ordered coordinate data list to provide a respective ordered, locally referenced, coordinate data list.

17. The method of claim 13, comprising determining with the processor a center of intensity of element locations in a portion of the element pattern present in the acquired image data.

18. The method of claim 17, wherein generating with the processor a number of coordinate data lists, each coordinate data list including coordinate data associated with at least three element locations in the acquired image data comprises:

generating with the processor a number of coordinate data lists, each coordinate data list including coordinate data corresponding to the determined center of intensity of the at least three element locations in the acquired image data.

19. The method of claim 17, wherein determining with the processor a center of intensity of element locations in a portion of the element pattern present in the acquired image data comprises:

determining with the processor the center of intensity of element locations in a portion of the element pattern present in the acquired image data using a number of grayscale values associated with each of the respective element locations.

20. The method of claim 13, comprising:

determining with the processor a respective distance between the image acquisition device and each of the elements in a portion of the pattern of elements incident upon the object positioned in the three-dimensional space; and determining with the processor a respective volume dimension associated with the object using the determined respective distances between the image acquisition device and each of the elements in a portion of the pattern of elements incident upon the object positioned in the three-dimensional space.

* * * * *